United States Patent

Itou et al.

[11] Patent Number: 5,926,337
[45] Date of Patent: Jul. 20, 1999

[54] OFF-TRACK CORRECTING METHOD OF DISK APPARATUS AND A DISK APPARATUS USING THE SAME

[75] Inventors: Kenji Itou; Isamu Tomita; Toshiki Kimura, all of Kawasaki, Japan

[73] Assignee: Fujitsu Limited, Kawasaki, Japan

[21] Appl. No.: 08/824,658

[22] Filed: Mar. 24, 1997

Related U.S. Application Data

[30] Foreign Application Priority Data

Aug. 2, 1996 [JP] Japan ................................. 8-204761

[51] Int. Cl.$^6$ .................................................. G11B 5/596
[52] U.S. Cl. .................................. 360/77.04; 360/78.04; 360/78.14
[58] Field of Search ........................... 360/77.04–77.05, 360/77.08, 78.04, 78.09, 78.14

[56] References Cited

U.S. PATENT DOCUMENTS

| | | |
|---|---|---|
| 4,731,680 | 3/1988 | Moriyama et al. . |
| 5,426,544 | 6/1995 | Narita et al. ........................ 360/77.04 |
| 5,521,773 | 5/1996 | Suzuki et al. ........................ 360/77.04 |
| 5,526,201 | 6/1996 | Takata et al. ........................ 360/77.04 |

FOREIGN PATENT DOCUMENTS 4-328368  11/1992  Japan .

*Primary Examiner*—W. R. Young
*Attorney, Agent, or Firm*—Greer, Burns & Crain, Ltd.

[57] ABSTRACT

Disclosed is an off-track correcting method for a disk apparatus for measuring an off-track correction value by use of servo data on a data surface. The data surface on a disk medium is recorded with servo data for an off-track measurement. The data head seals a cylinder position recorded with the off-track measurement servo data. It is determined whether or not this cylinder position is a sensitivity abnormal position of the cylinder. The data head reads a first item of servo data after offset-moving the data head by a predetermined quantity on inner and outer sides of the disk medium, corresponding to detecting that the data head is located in the sensitivity abnormal position. An off-track correction value in the cylinder position is calculated from the plural pieces of first servo data read finally in a plurality of reading positions. This, even when enhancing a track density, the precise off-track correction value can be thereby measured.

17 Claims, 15 Drawing Sheets

OFF-TRACK CORRECTING METHOD OF DISK APPARATUS AND A DISK APPARATUS USING THE SAME

BACKGROUND OF THE INVENTION

1. Field of the Invention

The present invention relates to an off-track correcting method of a disk apparatus and a disk apparatus using the same, of measuring an off-track correction value by use of servo data of a data surface, this method being used for the disk apparatus for locating a head with a servo signal of a servo surface on a disk medium.

2. Description of the Related Art

A magnetic disk apparatus is requested to increase a storage capacity. A magnetic disk of the magnetic disk apparatus is formed with a servo surface to which a servo signal is written. Then, a data head on the data surface is on-track-controlled in accordance with the servo signal given from the servo surface.

Even in such a servo control system based on the above servo surface, if an environmental temperature changes, every magnetic disk is expanded and contracted to a different degree. Hence, the data head easily off-tracks even when executing the servo control. Prevention of this thermal off-track involves measuring an off-track correction quantity of the data head at an interval of a fixed time. Then, when modifying servo control, the data head is on-track-controlled by adding the off-track correction quantity. This is termed an "off-track correction".

In addition, it is requested that a track pitch be narrowed to increase the storage capacity of the magnetic disk apparatus. Therefore, it is required that the off-track correction quantity be precisely measured even when the track pitch is relatively narrow.

FIG. 12 is a diagram showing a construction in the prior art. FIG. 13 is a flowchart of an off-track correction value measuring process in the prior art. FIG. 14 is an explanatory diagram of the operation in the prior art.

As illustrated in FIG. 12, three sheets of magnetic disks 90 are rotated by spindle motor 91. In this example, five surfaces among six surfaces of the three magnetic disks are used as data surfaces 90-1, and one remaining surface is employed as a servo surface 90-2. The servo signal is written to the servo surface 90-2. This servo signal is defined as a 2-phase servo signal.

This data surface 90-1 is provided with a magnetic head (a data head) 92-1. The data head 92-1 reads and writes data from and to the data surface 90-1. Provided in an outermost position on the data surface is a servo cylinder recorded with the servo signal for measuring the off-track correction value.

Further, the servo surface 90-2 is provided with a magnetic head (a servo head) 92-2. The servo head 92-2 reads servo data from the servo surface 90-2.

A rotary actuator (a voice coil motor) 93 moves these magnetic heads 92-1, 92-2 to be positioned in a radial direction of the magnetic disk 90. A servo demodulation circuit 94 generates two positional signals with a phase difference of 90 degrees from outputs of the servo head 92-2.

The data servo demodulation circuit 95, as mentioned below, demodulates five kinds of servo signals that are out of phase 90 degrees from the outputs of the data head 92-1. A read channel circuit 96 demodulates the data from the outputs of the data head 92-1. A control circuit 97 is formed with a processor.

A positioning operation of this magnetic disk apparatus will be described. The control circuit 97, upon receiving a seek instruction from a host device, executes coarse control. That is, a velocity curve corresponding to the number of tracks up to a target track is created. Then, a real velocity is calculated from a positional signal transmitted from a servo head 92-2. Obtained is a velocity error between the real velocity and a target velocity of the velocity curve. A rotary actuator 93 is controlled based on this velocity error.

A control circuit 97 detects a position from the positional signal. Then, upon detecting that a vicinity to the target is reached, the operation is switched over to fine control. More specifically, the control circuit 97 generates a fine control signal from the positional signal. Subsequently, the control circuit 97 controls the rotary actuator 93 on the basis of the fine control signal and an off-track correction value.

In the magnetic disk apparatus with the configuration mentioned above, the off-track correction value is measured and updated at the interval of a fixed time. For this measurement, the servo cylinder provided in an outermost position on a data surface 90-1 is formed with a servo pattern for an off-track measurement. That is, as illustrated in FIG. 14, the servo pattern for measuring an off-track correction value is formed extending from an "n−1" cylinder position to an "n+1" cylinder position. This servo pattern consists of five kinds of elements A, B, C, D, E.

A data servo demodulation circuit 95 demodulates detection outputs a, b, c, d, e of the respective elements A, B, C, D, E from outputs of the read head (a data head) 92-1. As illustrated in FIG. 14, when the read head 92-1 is located in a center position of the servo cylinder, the maximum output is the output c of the element C. When the read head 92-1 is located between the servo cylinder n and an inner position, i.e., the cylinder n−1, the maximum output is the output a of the element A. When the read head 92-1 is located in the inner cylinder position n−1 of the servo cylinder, the maximum output is the output e of the element E. When the read head 92-1 is located between the servo cylinder n and an outer cylinder position n+1, the maximum output is the output b of the element B. When the read head 92-1 is located in the outer cylinder position n+1 of the servo cylinder, the maximum output is the output d of the element D.

The off-track correction value has been, as shown in FIG. 13, measured by making use of the detection outputs described above.

To start with, the control circuit 97 drives the rotary actuator 93, and the servo head 92-2 is made to seek to the servo cylinder. At this time, a drive command value is obtained by adding the off-track correction value obtained by the measurement of the last time to a command value in the center position of the servo track. With this operation, the data head 92-1 is moved to the servo cylinder.

Next, the control circuit 97 checks whether or not a seek error occurs. Upon the off-track correction, it might happen that the servo head 92-2 is located in a boundary position of servo track on the servo surface. When located in this boundary, it follows that the servo detection output of the servo head 92-2 oscillates. As a result, the head oscillates enough not to converge at a predetermined position. A seek error due to this is detected.

When the seek error occurs, the control circuit 97 executes an error process. For example, the data head is inhibited from read/write operations.

On the other hand, if no seek error occurs, it follows that the servo head 92-2 and the data head 92-1 are located in that servo cylinder position. Then, the data head 92-1 reads the servo data in that position. For averaging, this operation is repeated three times.

An off-track correction value (an offset quantity) is obtained as follows from the detection outputs a, b, c, d, e of the respective elements A, B, C, D, E of the read servo data. When the data head 92-1 is located in a 3 μm zone d1, the maximum output is the output a of the element A. When the output level of the element A comes to the maximum, an off-track correction value T is obtained from the outputs e, c of the elements E, C in the following formula:

$$T = e - c + 3 \quad (1)$$

When the data head 92-1 is located in a 3 μm zone d2, the output b of the element B comes to the maximum. When the maximum output is the output b of the element B, the off-track correction value T is obtained from the outputs c, d of the elements C, D in the following formula:

$$T = c - d - 3 \quad (2)$$

When the data head 92-1 is located in a 3 μm zone d3, the output c of the element C comes to the maximum. When the maximum output is the output c of the element C, the off-track correction value T is obtained from the outputs a, b of the elements A, B in the following formula:

$$T = a - b \quad (3)$$

When the data head 92-1 is located in a 3 μm zone d4, the output d of the element D comes to the maximum. When the maximum output is the output d of the element D, the off-track correction value T is obtained from the outputs b, a' of the elements B, A' in the following formula:

$$T = b - a' - 6 \quad (4)$$

When the data head 92-1 is located in a 3 μm zone d5, the output e of the element E comes to the maximum. When the maximum output is the output e of the element E, the off-track correction value T is obtained from the outputs b', a of the elements B', A in the following formula:

$$T = b' - a + 6 \quad (5)$$

Note that the servo data is read three times, and the average value of the obtained off-track correction values is used as an off-track correction value to reduce a scatter in the off-track correction values as much as possible.

Thus, according to the prior art, there is measured the off-track correction value corresponding to the off-track quantity of the data head 92-1 when the data head 92-1 is located in the servo cylinder.

FIG. 15 is an explanatory diagram showing a problem inherent in the prior art.

As shown in FIG. 14, to be ideal, it is desirable that the off-track quantity and the off-track correction value be in a linear relationship. Referring to FIG. 14, the read head has 3.5 μm for a track pitch 6 μm.

As illustrated in FIG. 15, however, when a core width of the read head is as wide as, e.g., 4.5 μm due to a manufacturing scatter, and when a characteristic deterioration of the head happens, as shown in FIG. 15, it is impossible for the off-track correction value to keep the linear relationship with respect to the off-track quantity. Particularly in disconnected points marked with circles in FIG. 15 between line segments, an unsensitive zone (a sensitivity deteriorated portion) might be produced as the case may be.

In such a phenomenon, an influence by the read characteristic of the read head becomes larger as the track pitch is narrower. Hence, when the data head is located in the sensitivity deteriorated position, there arises such a problem that the off-track correction quantity can not be accurately measured. This makes it difficult to accurately perform the off-track correction.

SUMMARY OF THE INVENTION

It is a primary object of the present invention to provide an off-track correcting method of a disk apparatus and a disk apparatus using the same, capable of performing a precise off-track correction even by enhancing a track density.

It is another object of the present invention to provide an off-track correcting method of a disk apparatus and a disk apparatus using the same, capable of measuring a precise off-track correction value irrespective of characteristics of a read head.

According to the present invention, a disk apparatus includes a disk medium having a data surface having a cylinder recorded with a first servo data for an off-track measurement and a servo surface containing a second servo data for locating in each cylinder, a data head for reading a signal on the data surface on the disk medium, a servo head for reading a signal on the servo surface on the disk medium, a positioning mechanism for positioning the data head and the servo head, and a control circuit for controlling the positioning mechanism on the basis of a second servo signal read by the servo head and an off-track correction value. Then, the control circuit measures the off-track correction value.

Further, an off-track correcting method according to the present invention comprises a step of seeking the servo head to a cylinder position recorded with the first servo data. Detected next is whether or not the data head is located in a sensitivity abnormal position of the cylinder. Subsequently, the data head reads the first servo data after offset-moving the servo head and the data head by a predetermined quantity on an inner or outer side on the disk medium in accordance with detecting that the data head is located in the sensitivity abnormal position. Next, the data head read the first servo data after offset-moving the servo head and the data head on the outer or inner side on the disk medium. Finally, an off-track correction value in the cylinder position is calculated from at least the plural pieces of first servo data read.

According to the present invention, when the head is located in the servo cylinder for measuring the off-track quantity, whether or not the position in which to locate the head is a sensitivity abnormal position of the cylinder, is detected. Then, upon detecting that the head is located in the sensitivity abnormal position, the head is offset-moved on the inner and outer sides, thus reading the first servo data. In the position offset to steer clear of this sensitivity abnormal position, the off-track correction value is calculated from the first servo data.

Therefore, the measured data in the sensitivity abnormal position are not used as they are, and hence the precise off-track correction value can be measured. The off-track correction can be thereby executed more accurately.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which.

DETAILED DESCRIPTION OF THE PREFERRED EMBODIMENTS

Figure 1:
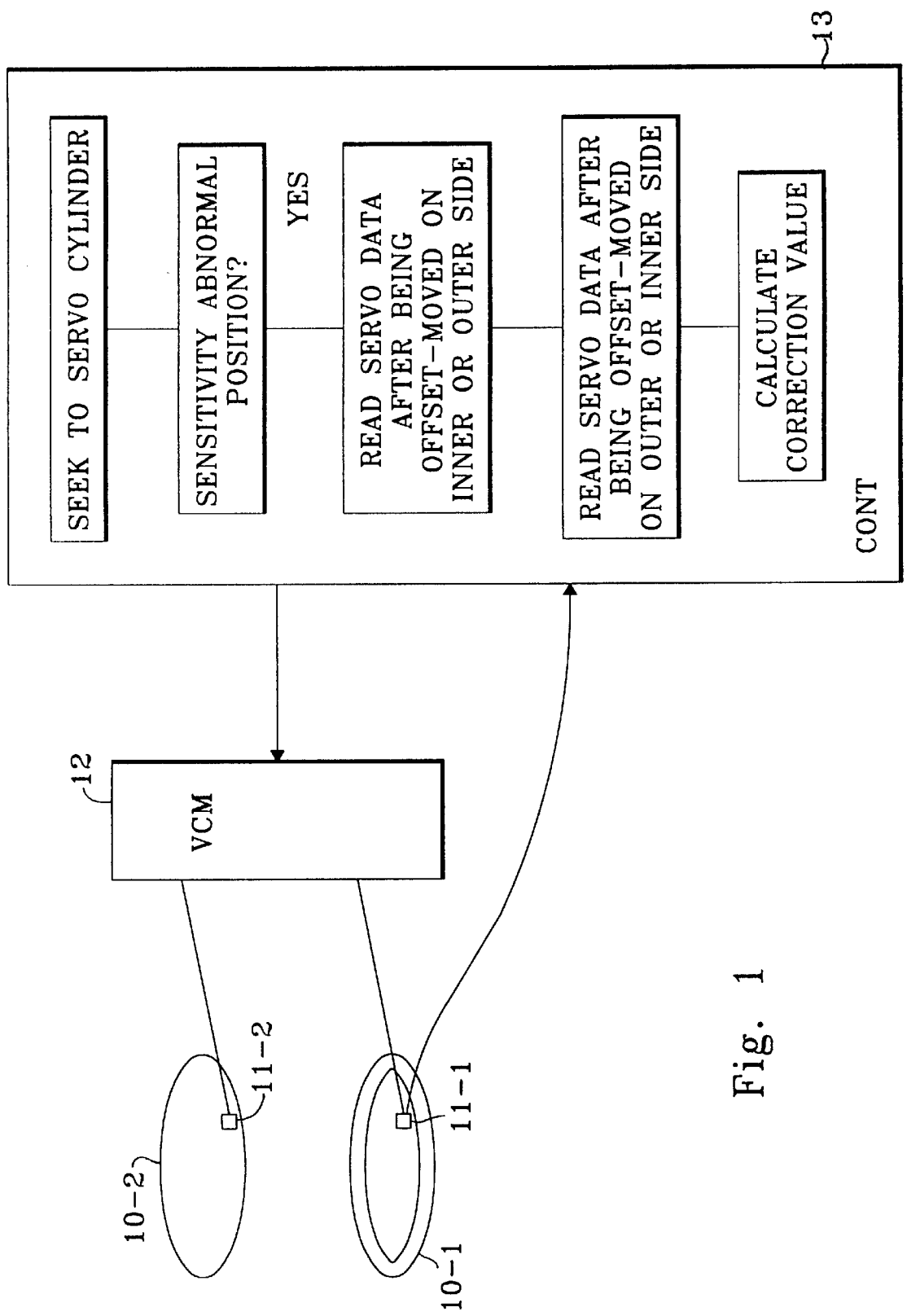
FIG. 1 is a diagram of the principle of the present invention.

FIG. 1 is a diagram showing the principle of the present invention.

A disk apparatus includes a disk medium 10 having a data surface 10-1 containing a cylinder recorded with a first servo data for measuring an off-track, and a servo surface 10-2 with cylinders each containing a second servo data for positioning. This disk apparatus is constructed of a data head 11-1 for reading a signal on the data surface 10-1 of the disk medium 10, a servo head 11-2 for reading a signal on the servo surface 10-2 of the disk medium 10, a positioning mechanism 12 for positioning the data head 11-1 and the servo head 11-2, and a control circuit 13 for controlling the positioning mechanism 12 on the basis of the second servo signal read by the servo head 1-2 and an off-track correction value. This control circuit 13 measures an off-track correction value.

Then, the following is an operation by an off-track correction method.

To start with, the servo head 11-2 seeks to a cylinder position where the first servo data exists. Next, whether or not the data head 11-1 is located in a cylinder sensitivity abnormal position, is detected with this seeking. Subsequently, corresponding to the detection that the data head 11-1 is located in the sensitivity abnormal position, the servo head 11-2 and the data head 11-1 are offset-moved by a predetermined quantity on an inner or outer side on the disk medium 10. Then, in that offset position, the data head 11-1 reads the first servo data (a first reading step). Next, the servo head 11-2 and the data head 11-1 are offset-moved by a predetermined quantity on the outer or inner side on the disk medium 10. In that offset position, the data head read the first servo data (a second reading step). Finally, an offset correction value in the above-described cylinder position is calculated from plural pieces of first servo data read by at least the first and second reading steps.

Figure 2:
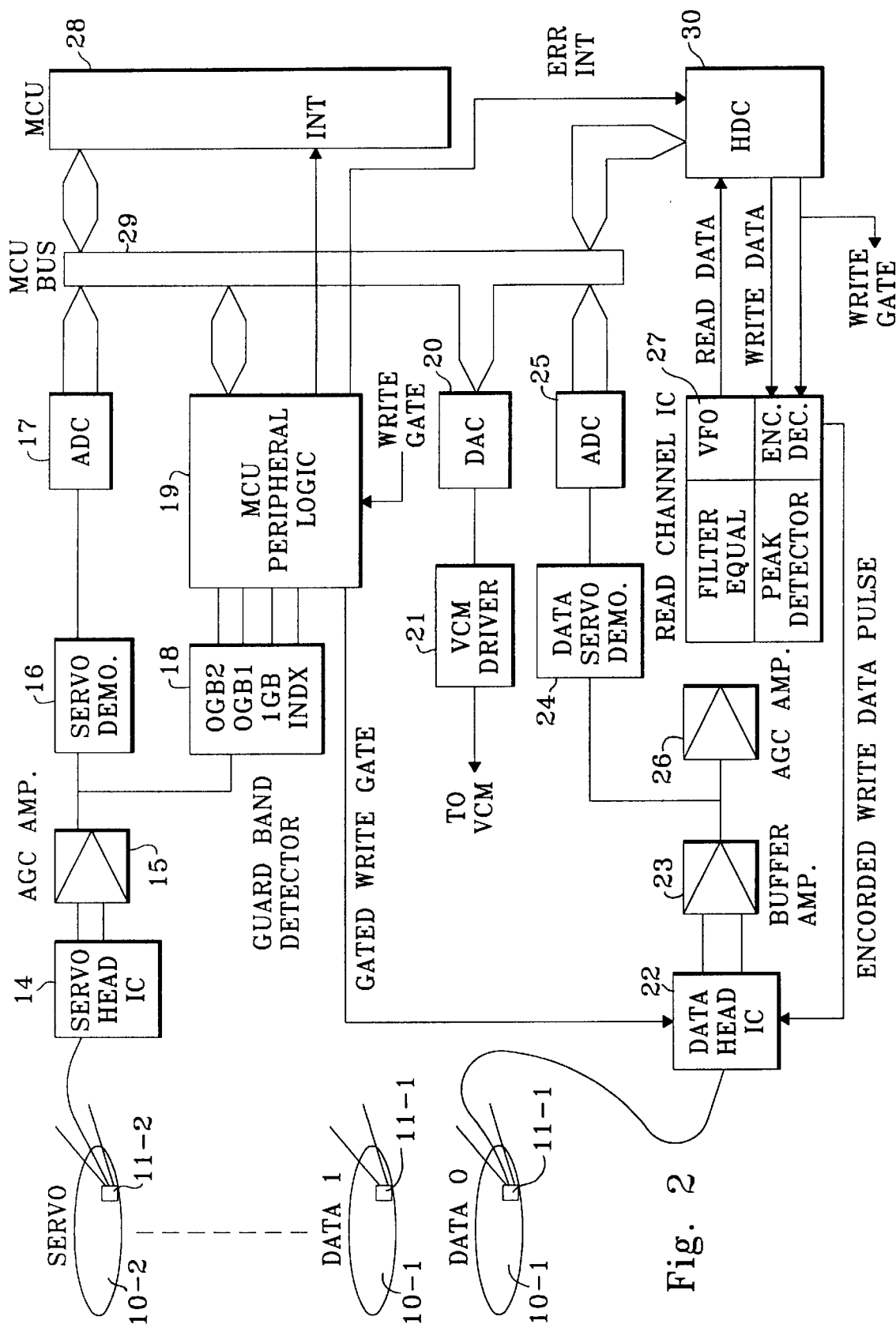
FIG. 2 is a diagram illustrating a construction in one embodiment of the present invention.

FIG. 2 is a diagram showing a construction in one embodiment of the present invention.

Figure 14:
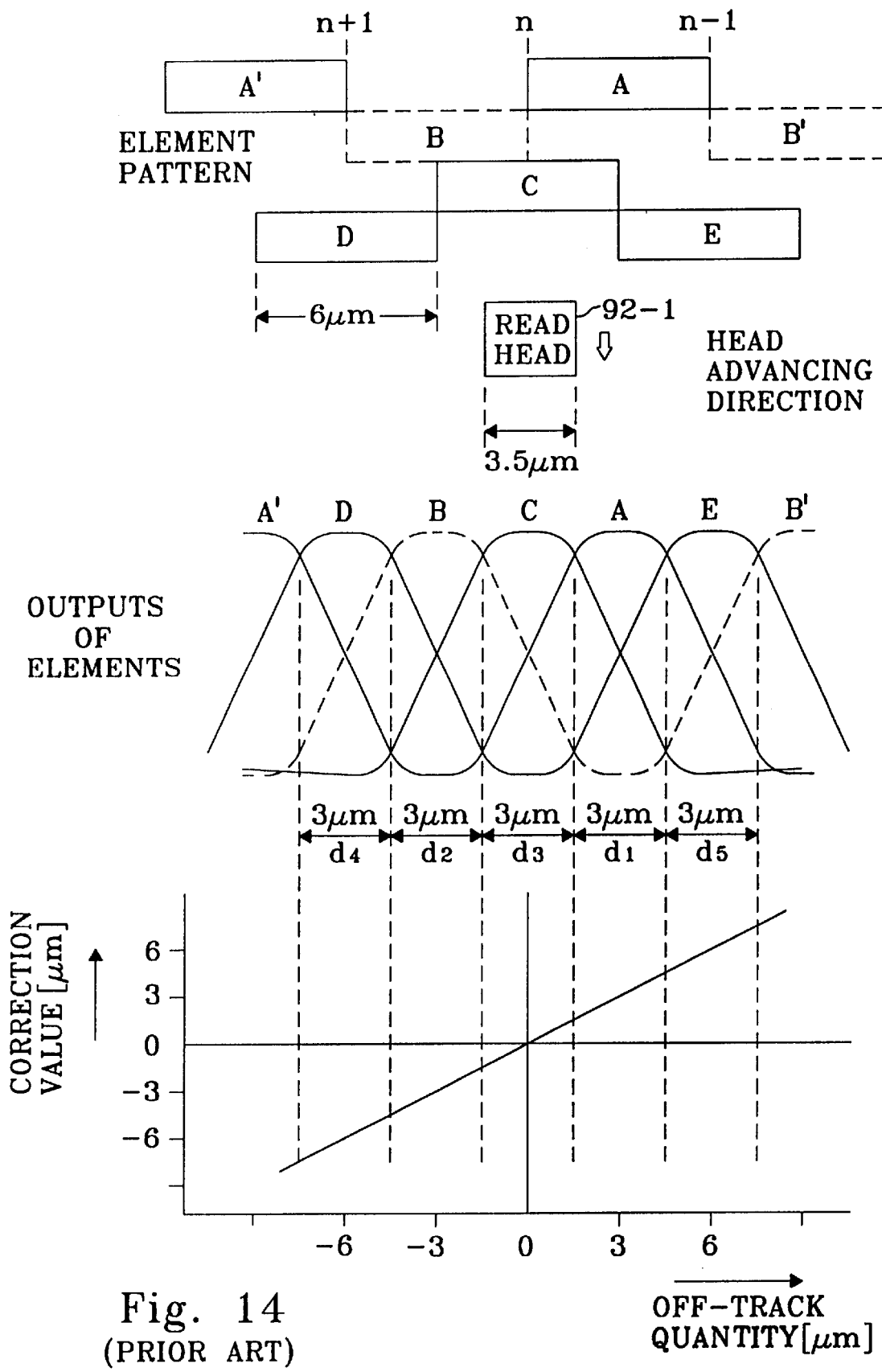
FIG. 14 is an explanatory diagram showing an operation in the prior art.
Figure 15:
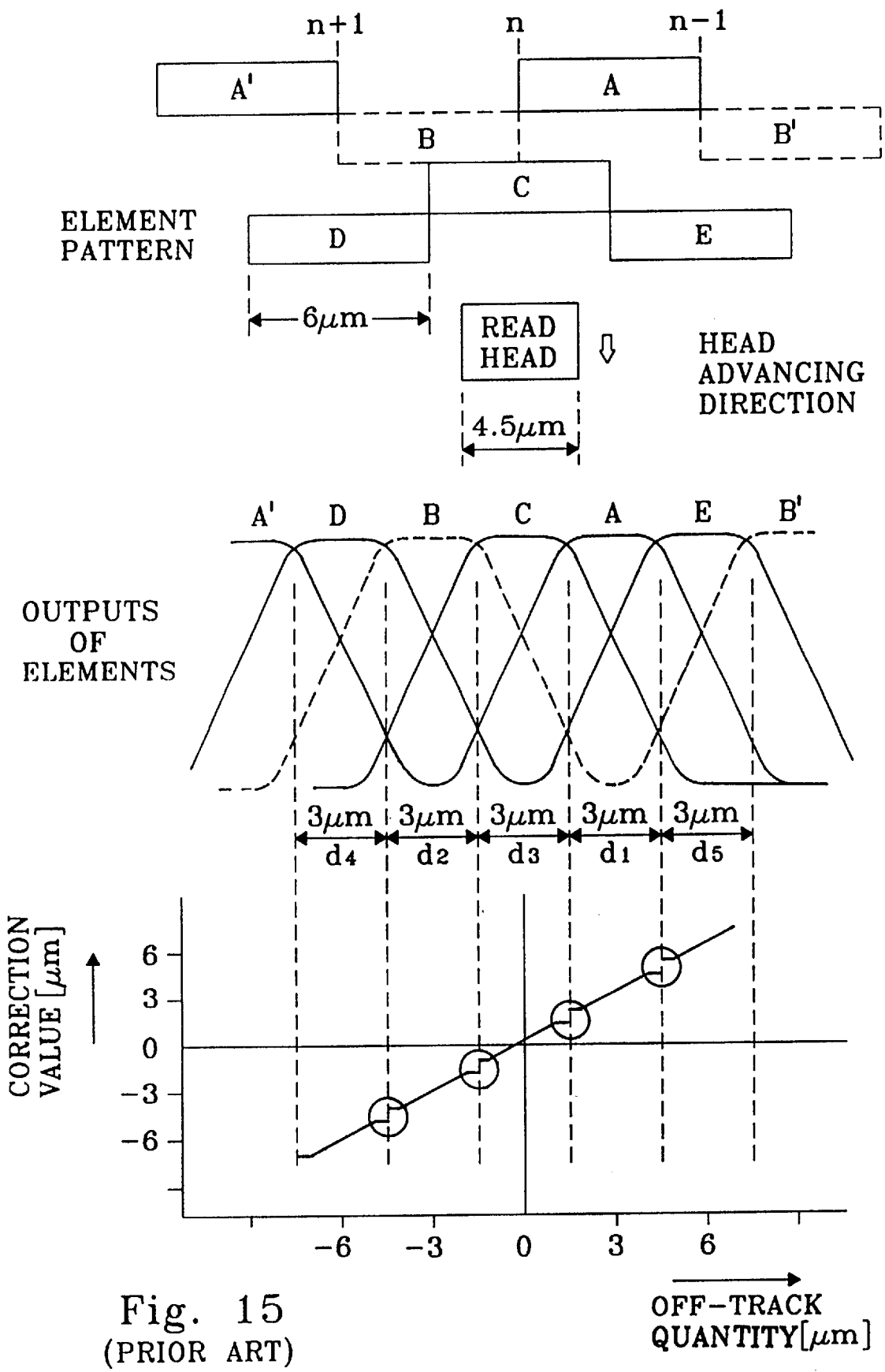
FIG. 15 is an explanatory diagram of a problem in the prior art.

As illustrated in FIG. 2, n-pieces of magnetic disks 10 are rotated by an unillustrated spindle motor. In this embodiment, one surface of the magnetic disk 10 serves as a servo surface 10-2, while the other surface serves as a data surface 10-1. Servo data (a first servo data) for measuring an off-track quantity shown in FIGS. 14 and 15 is written to an outermost cylinder (referred to as a servo cylinder) on each data surface. Further, a second servo data is written to the servo surface 10-2. The second servo data is of, e.g., a 2-phase servo pattern.

The data surface 10-1 is provided with a magnetic head (a data head) 11-1. The data head 11-1 reads and writes data from and to the data surface 10-1. Also, the servo surface 10-2 is provided with a magnetic head (a servo head) 11-2. The servo head 11-2 reads the data from the servo surface 10-2.

An unillustrated rotary actuator (a voice coil motor) positions these magnetic heads 11-1, 11-2 in a radial direction on the magnetic disk 10.

A servo head IC 14 amplitudes a read signal from the servo head 11-2. An AGC (Automatic Gain Control) amplifier 15 automatically gain-controls the signal read by the servo head 11-2, thus controlling a level of the signal to be kept constant.

A servo demodulation circuit 16 is generates two positional signals POSN, POSQ with a phase difference of 90 degrees form outputs of the AGC amplifier 15. An A/D (Analog/Digital) converter 17 converts the positional signals POSN, POSQ into digital values.

A guard band detection circuit 18 generates outer guard band signals 1, 2, an inner guard band signal and an index signal from the outputs of the AGC amplifier 15. An MCU peripheral logic circuit 19 transfers these signals to an MCU bus 29.

A D/A (Digital/Analog) converter 20 converts a digital command value from the MCU 28 into an analog command quantity. A VCM drive circuit 21 drives a rotary actuator (VCM) in accordance with the analog command quantity.

A data head IC 22 amplifies a read signal transmitted from the data head 11-1, and write-drives the data head 11-1 by use of write data. A buffer amplifier 23 amplifies the read signal given from the data head IC 22.

A data servo demodulation circuit 24 demodulates the above-described five kinds of element servo signals from the read signals transmitted from the buffer amplifier 23. An A/D (Analog/Digital) converter 25 converts the servo signal into a digital value.

An AGC (automatic Gain Control) amplifier 26 automatically gain-controls the signals read by the data head 11-1 and controls a signal level to be kept constant. A read channel IC 27 includes a filter, an equalizer, a peak detector, a voltage control type oscillator, an encoder and a decoder.

The read channel IC 27 demodulates the read signal from the AGC amplifier 26 and outputs read data. The read channel IC 27 encodes write data and outputs the thus encoded write data to the data head IC 22.

An MCU (Micro Controller Unit) 28 is constructed of a microprocessor and a digital signal processor. The MCU 28 constitutes the control circuit 13 shown in FIG. 1. Then, the MCU 28 reads a servo signal and controls positioning of the head. An MCU bus 29 connects the MCU 28, the A/D converters 17, 25, the D/A converter 20, the MCU peripheral logic circuit 19 and a hard disk controller 30.

A hard disk controller 30 receives and transfers the command and the data from and to a host device. Then, the hard disk controller 30 transmits the write data to the reach channel IC 27, and outputs a write gate signal to the MCU peripheral logic circuit 19. The MCU peripheral logic circuit 19 transmits a gated write gate signal to the data head IC 22 in accordance with the write gate signal and an internal control signal.

A hard disk controller 30 receives the read data from the read channel IC 27 and transfers the data to the host device. Further, the hard disk controller 30 gives a seek indication to the MCU 28 via the MCU bus 29.

In this embodiment, the MCU 28 implements the head positioning control. The hard disk controller 30 executes the read/write control. The hard disk controller 30 further controls the whole in accordance with the commands from the host device.

Figure 3:
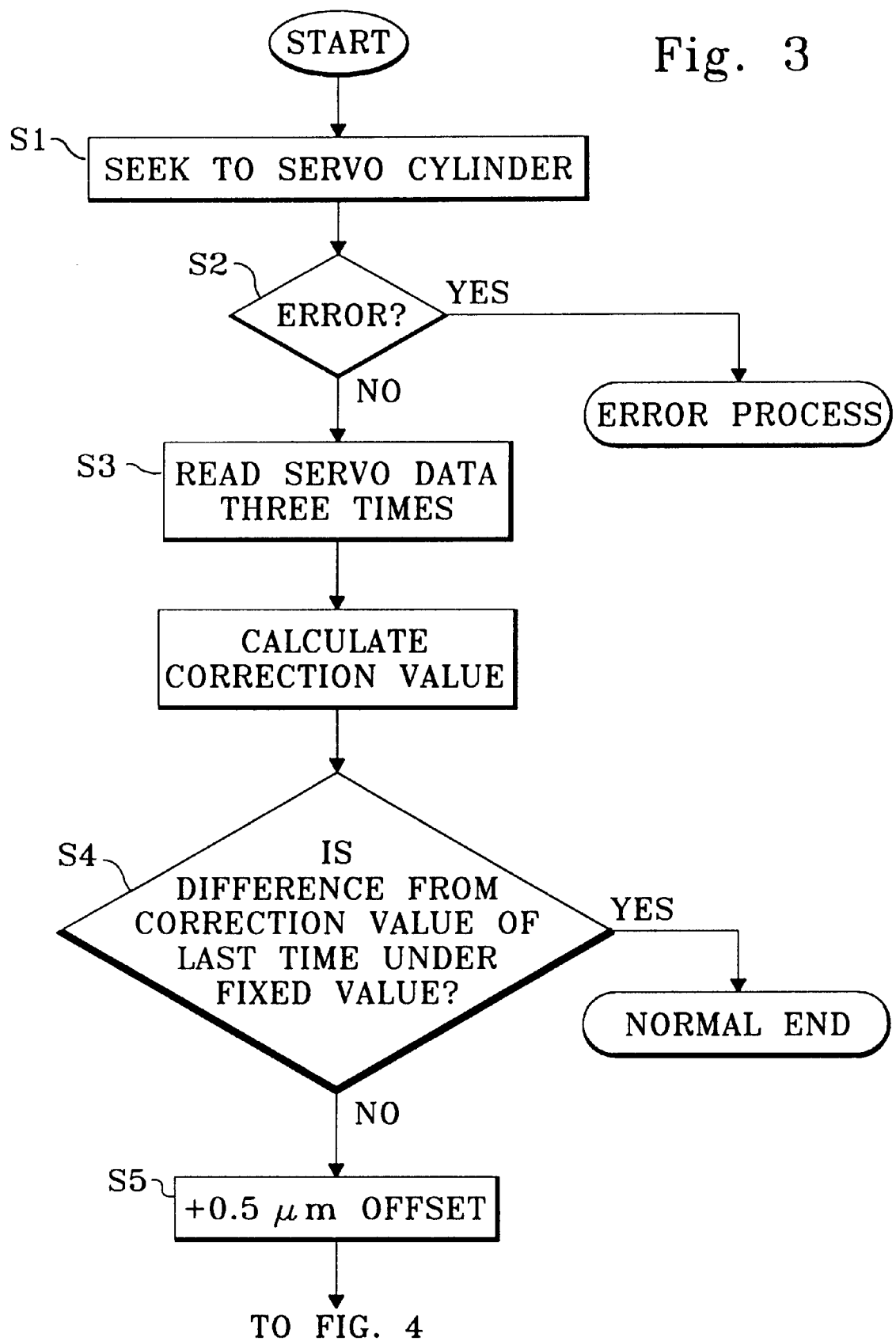
FIG. 3 is a flowchart (part 1) showing a measuring process in a first embodiment of the present invention.
Figure 4:
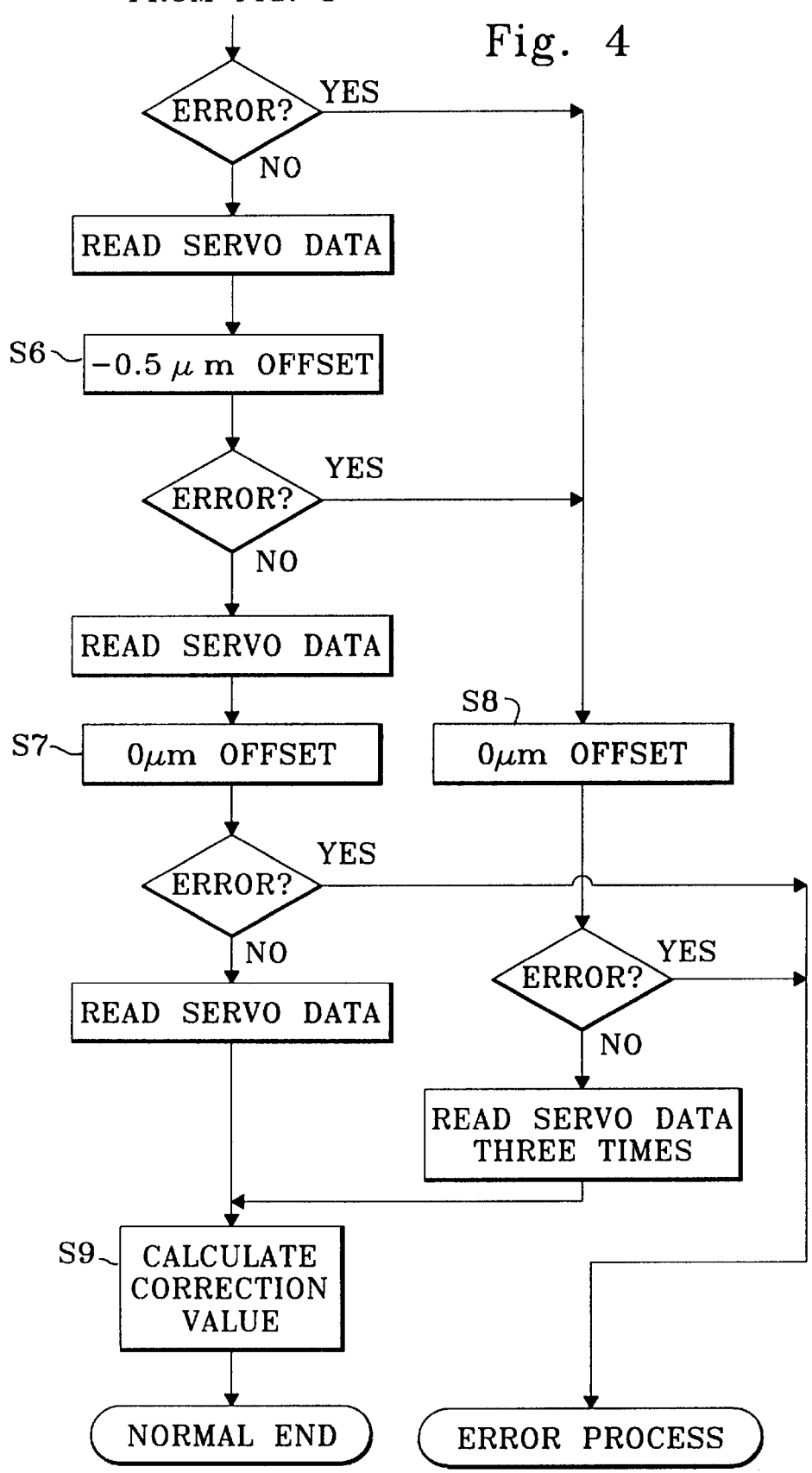
FIG. 4 is a flowchart (part 2) showing the measuring process in the first embodiment of the present invention.
Figure 5:
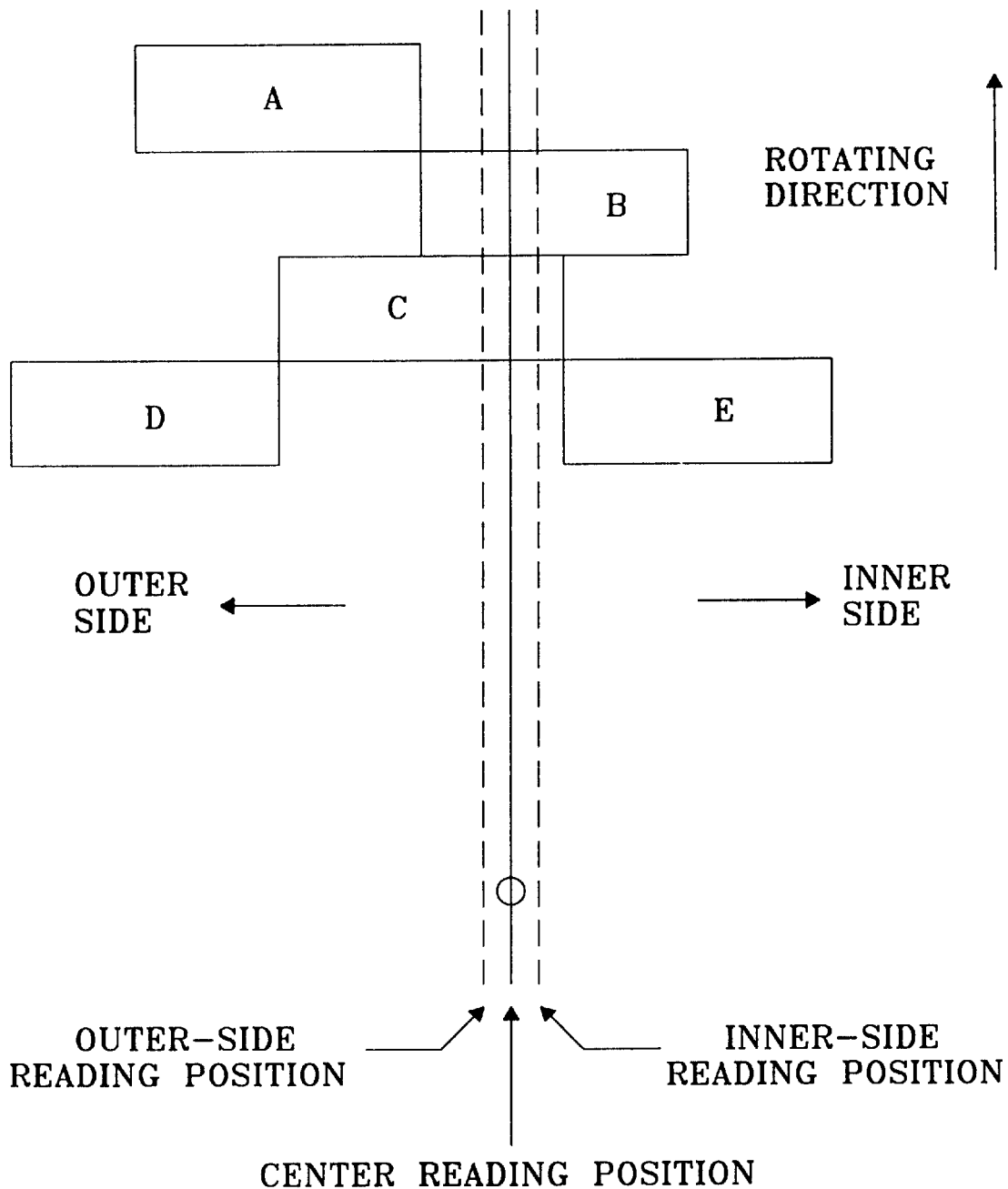
FIG. 5 is an explanatory diagram showing the measuring process in the first embodiment of the present invention.
Figure 6:
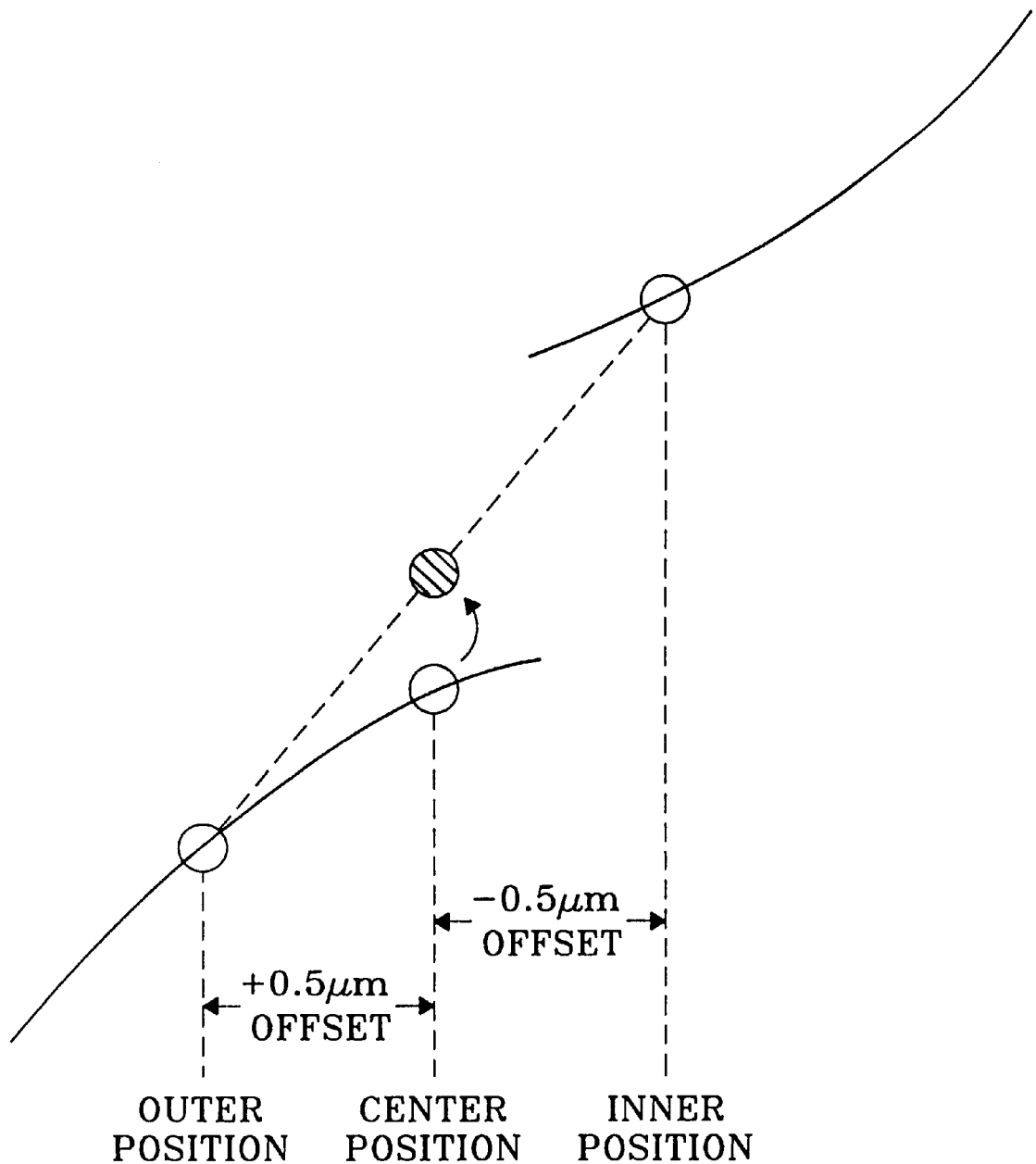
FIG. 6 is an explanatory diagram showing the measuring process in the first embodiment of the present invention.

FIGS. 3 and 4 are flowcharts showing a measuring process according to the present invention. FIG. 5 is an explanatory diagram of the measuring operation thereof. FIG. 6 is an explanatory diagram of the measuring process thereof.

(S1) The measuring process is executed at an interval of a fixed time. After a fixed time has elapsed, with an interrupt, the MCU 28 starts the measuring process of an off-track correction value.

To begin with, the MCU 28 positions the servo head 11-2 and the data head 11-1 in a servo cylinder recorded with an off-track correction servo pattern. Therefore, the MCU 28 outputs, to the D/A converter 20, a command value obtained by adding the off-track correction value to the command value for the servo cylinder. The VCM 12 is thereby driven through a VCM drive circuit 21.

Consequently, the servo head 11-2 and the data head 11-1 seek-moves to the servo cylinder.

(S2) The MCU 28 examines whether or not there is any seek error. The MCU 28 reads the servo signal of the servo head 11-2 at an interval of a predetermined period through the A/D converter 17, and effects the servo control. Then, the MCU 28 checks whether the servo signals converge or not. If the servo signals do not converge within a predetermined time, it is determined that the servo head is located in a boundary position of the servo track. An occurrence of the seek error is thereby detected.

Once the seek error occurs, the MCU 28 performs the error process. For example, the read/write operation of that data head is inhibited.

(S3) On the other hand, the MCU 28, when determining that the seek error does not occur, makes the data head 11-1 read the servo data on the servo cylinder through the A/D converter 25 in this head position (called a center position). This process is repeated three times for averaging.

Then, the MCU 28 calculates the off-track correction value by use of the above-described formulae (1) through (5), from detection output levels a, b, c, d, e of respective elements A, B, C, D, E of the read servo data. As stated above, the off-track correction value is calculated every time the reading process is done because of the reading process being executed three times, and an average value of those off-track correction values is calculated.

(S4) Next, the MCU 28 calculates a difference between the measured off-track correction value and the off-track correction value measured last time. The MCU 28 compares this difference with a fixed value. If this difference exceeds the fixed value, it is determined that the off-track correction values of the this time and the last time are discontinuous. In this case, there might be a possibility wherein the data head 11-1 is located in a cylinder sensitivity abnormal position.

Reversely if this difference is under the fixed value, it is determined that the off-track correction value is continuous. That is, it is that the off-track quantity and the off-track correction value are in a linear relationship. Therefore, the MCU 28 updates the off-track correction value to the off-track correction value measured this time, and is ended with normality.

(S5) In step S4, the MCU 28, when determining that the above-described difference exceeds the fixed value, causes the data head 11-1 and the servo head 11-2 to make offset shifts from the center position to a position of +0.5 μm (called an outer position) as shown in FIG. 5. Therefore, the MCU 28 sets the off-track correction value equivalent to +0.5 μm as a command value, and outputs it to the D/A converter 20. Hence, the data head 11-1 is, as illustrated in FIG. 5, shifted from the center position to the +0.5 μm outer position.

The MCU 28, as in the above-mentioned case, examines whether or not the seek error occurs. The MCU 28 checks whether or not the servo signals from the A/D converter 17 converge. If the servo signals do not converge within the predetermined time, it is determined that the servo head is located in the boundary position of the servo track. The occurrence of the seek error is thereby detected. When the seek error occurs, the MCU 28 proceeds to step S8.

On the other hand, the MCU 28, when judging that no seek error occurs, makes the data head 11-1 read the servo data on the servo cylinder in this outer position through the A/D converter 25. Then, the MCU 28 holds the detection output levels a, b, c, d, e of the respective elements A, B, C, D, E of the read servo data.

(S6) The MCU 28 causes the data head 11-1 and the servo head 11-2 to make offset shifts from the center position to a position of −0.5 μm (called an inner position) as shown in FIG. 5. Therefore, the MCU 28 sets the off-track correction value equivalent to −1.0 μm as a command value, and outputs it to the D/A converter 20. Hence, the data head 11-1 is, as illustrated in FIG. 5, located in the −0.5 μm inner position.

The MCU 28, as in the above-mentioned case, examines whether or not the seek error occurs. The MCU 28 checks whether or not the servo signals from the A/D converter 17 converge. If the servo signals do not converge within the predetermined time, it is determined that the servo head is located in the boundary position of the servo track. The occurrence of the seek error is thereby detected. When the seek error occurs, the MCU 28 proceeds to step S8.

On the other hand, the MCU 28, when finding that no seek error occurs, makes the data head 11-1 read the servo data on the servo cylinder in this inner position through the A/D converter 25. Then, the MCU 28 holds the detection output levels a, b, c, d, e of the respective elements A, B, C, D, E of the read servo data.

(S7) The MCU 28 causes the data head 11-1 and the servo head 11-2 to make offset shifts to the center position as shown in FIG. 5. Therefore, the MCU 28 sets the off-track correction value equivalent to +0.5 μm as a command value, and outputs it to the D/A converter 20. Hence, the data head 11-1 is, as illustrated in FIG. 5, located in the center position.

The MCU 28, as in the above-mentioned case, examines whether or not the seek error occurs. The MCU 28 checks whether or not the servo signals from the A/D converter 17 converge. If the servo signals do not converge within the predetermined time, it is judged that the servo head is located in the boundary position of the servo track. The occurrence of the seek error is thereby detected. When the seek error occurs, the MCU 28 executes an error process. For instance, the MCU 28 inhibits the data head from reading and writing the data.

On the other hand, the MCU 28, when judging that no seek error occurs, makes the data head 11-1 read the servo data on the servo cylinder in this center position through the A/D converter 25. Then, the MCU 28 holds the detection output levels a, b, c, d, e of the respective elements A, B, C, D, E of the read servo data.

(S8) The MCU 28, when judging that the seek error occurs, causes the data head 11-1 and the servo head 11-2 to make offset shifts (called a "0" μm offset) to the center position. Therefore, the MCU 28 sets the off-track correction value equivalent to −0.5 or +0.5 μm as a command value, and outputs it to the D/A converter 20. Hence, the data head 11-1 is, as illustrated in FIG. 5, located in center position.

The MCU 28, as in the above-mentioned case, examines whether or not the seek error occurs. The MCU 28 checks whether or not the servo signals from the A/D converter 17 converge. If the servo signals do not converge within the predetermined time, it is determined that the servo head is located in the boundary position of the servo track. The occurrence of the seek error is thereby detected. When the seek error occurs, the MCU 28 carry out the error process. For example, the MCU 28 inhibits the data head from reading and writing the data.

On the other hand, the MCU 28, when finding that no seek error occurs, makes the data head 11-1 read the servo data on the servo cylinder in this center position through the A/D converter 25. Then, the MCU 28 holds the detection output levels a, b, c, d, e of the respective elements A, B, C, D, E of the read servo data. The MCU 28 performs this reading operation three times and holds the output levels of the servo data each time.

(S9) In step S7 or S8, the MCU 28, when finishing the reading process of the servo data, calculates the off-track correction value. That is, the MCU 28 calculates the off-track correction value by use of the above-described formulae (1) through (5) from the detection output levels a, b, c, d, e of the respective elements A, B, C, D, E of the read servo data.

In step S7, when reading the servo data, as explained above, the reading process is executed three times in the outer, inner and center positions, and hence the off-track correction value is calculated each time the reading process is done. Then, an average value of these off-track correction values is calculated. The off-track correction value to be stored is updated based on the thus measured off-track correction value.

As shown in FIG. 6, the correction value in the center position with a possibility of being the sensitive abnormality is to be corrected by the correction value in the inner and outer positions undefined as the sensitivity abnormal positions. Therefore, the off-track correction value in the center position becomes a more precise value.

On the other hand, in step S8, when reading the servo data, as stated above, the reading process is executed three times in the center position, and therefore the off-track correction value is calculated each time the reading process is done. Then, the average value of these off-track correction values is calculated. The off-track correction value is updated based on the measured off-track correction value. Then, the operation comes to an end.

Thus, the data head is offset on the inner and outer sides by detecting that the data head is located in the sensitivity abnormal position. Subsequently, the servo data is read in that offset position, thereby calculating the off-track correction value. Further, the off-track correction value in the center position is obtained from those off-track correction values measured by offsetting. Hence, even when the head is located in the sensitivity abnormal portion, the accurate off-track correction value is obtained. Even if the track pitch is narrowed, the precise off-track correction is thereby attainable.

Further, the fact that the data head is located in the sensitivity abnormal position is detected by comparing the correction value measured this time with the correction value measured last time, and it is therefore feasible to easily detect that the head is located in the sensitivity abnormal position.

Moreover, when the seek error happens in the inner or outer offset position, it is impossible to measure the off-track quantity in the inner or outer position. For this reason, although the center position has a possibility of being the sensitivity abnormal position, the off-track correction value measured in the center position is to be used. With this arrangement, a more accurate off-track correction value than by using the off-track correction value of the last time without any measurement, is obtained.

Figure 7:
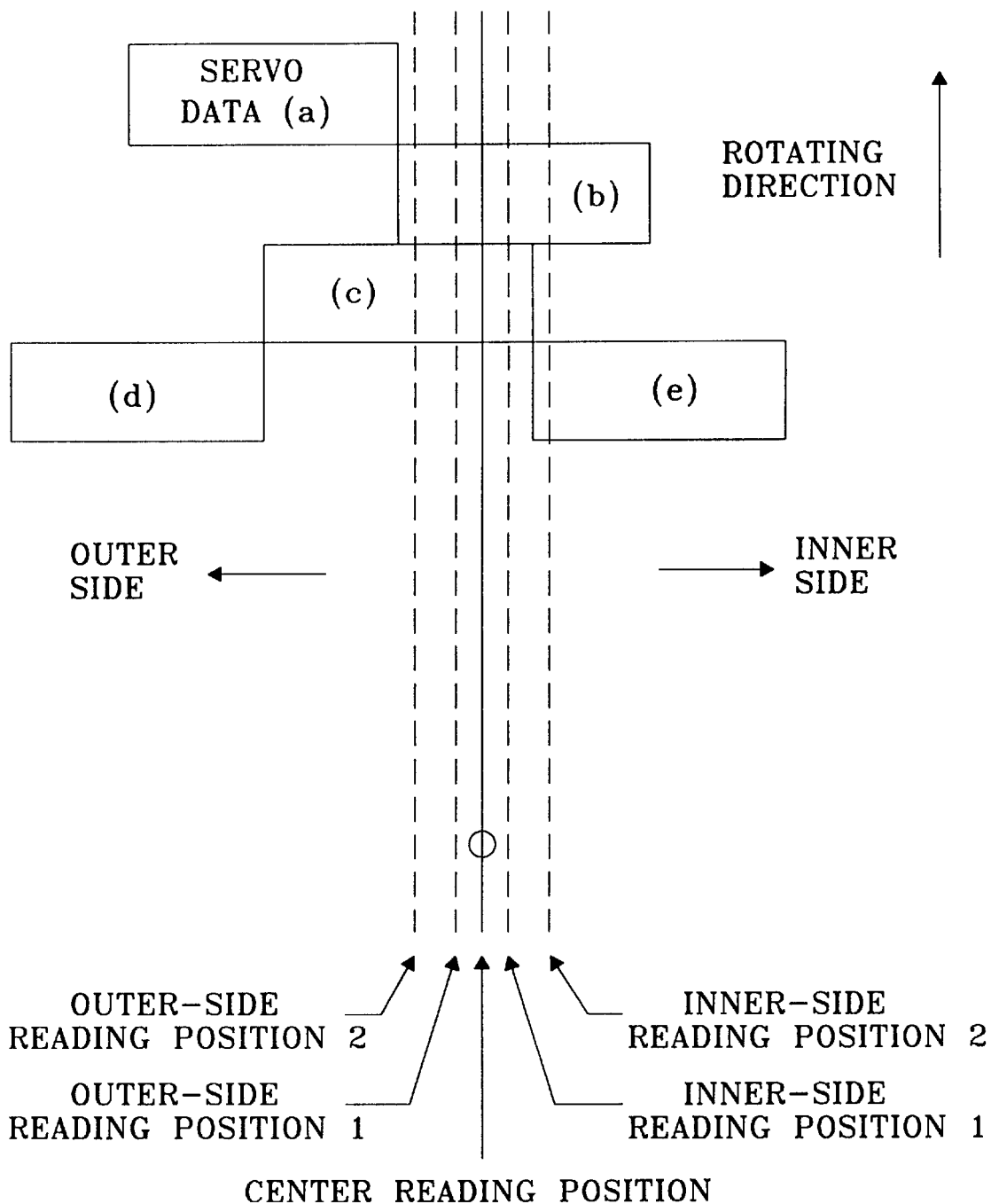
FIG. 7 is an explanatory diagram illustrating a second embodiment of the present invention.

FIG. 7 is an explanatory diagram showing a second embodiment of the present invention.

In accordance with the first embodiment shown in FIG. 5, the off-track quantity is measured in one outer position and in one inner position. In the second embodiment, however, the off-track quantity is measured in two outer positions and in two inner position. With this arrangement, the off-track correction quantity can be measured more precisely.

Figure 8:
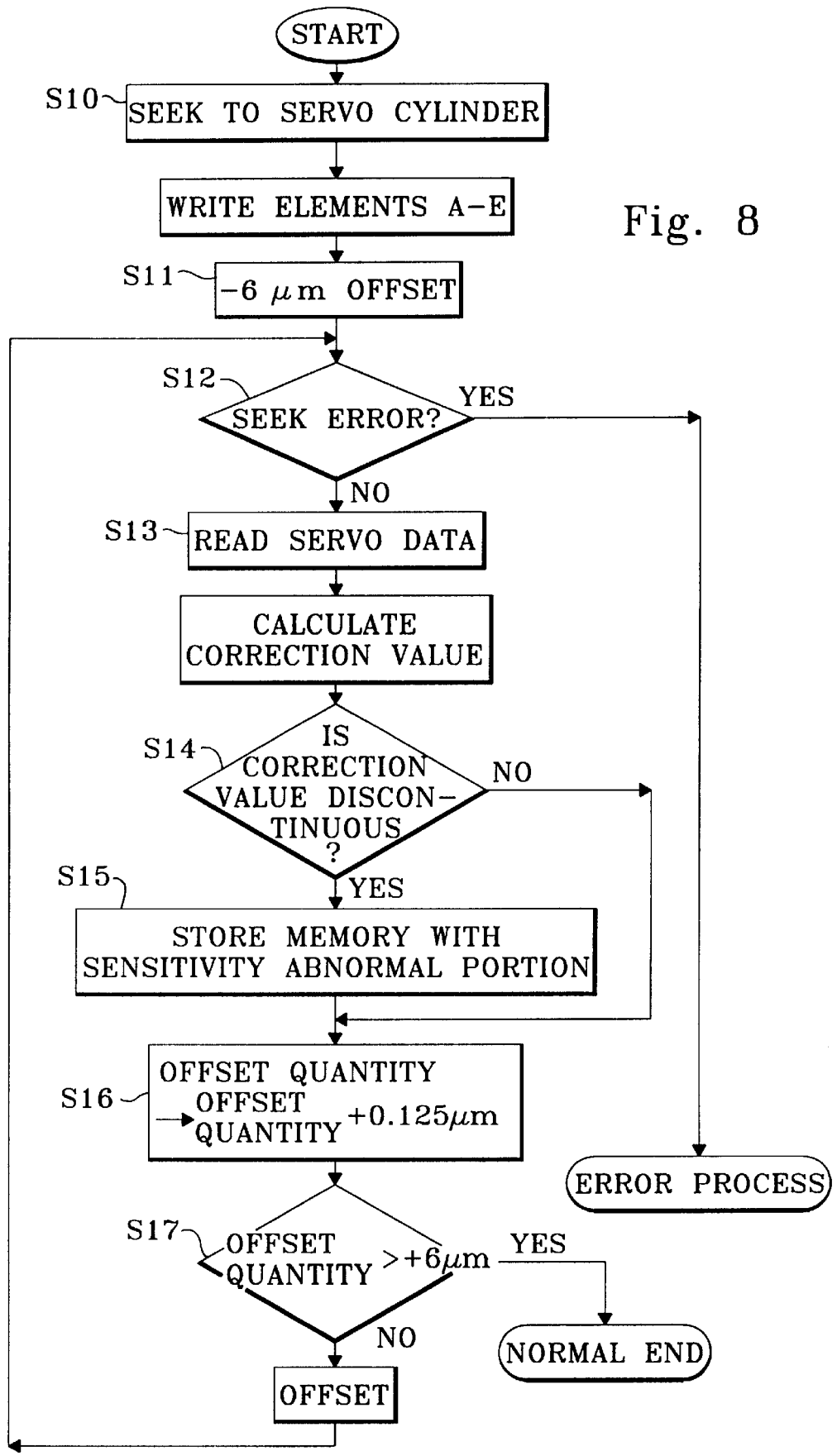
FIG. 8 is a flowchart showing a servo writing process in a third embodiment of the present invention.
Figure 9:
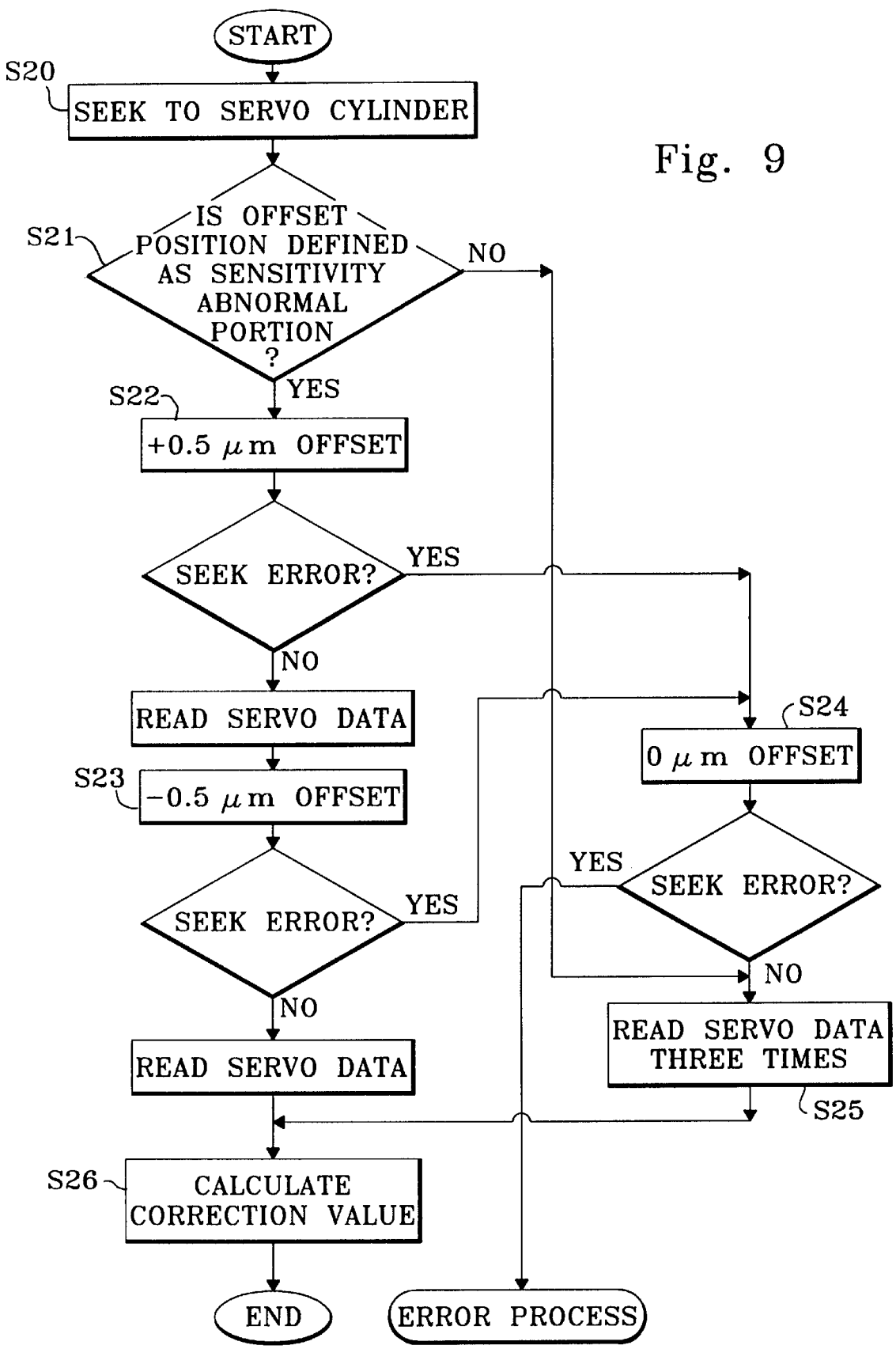
FIG. 9 is a flowchart showing a correction value measuring process in the third embodiment of the present invention.

FIG. 8 is a flowchart showing a servo writing process in a third embodiment of the present invention. FIG. 9 is a flowchart showing a correction value measuring process in the third embodiment of the present invention.

(S10) In the servo writing process when delivered from the factory, the following processes are executed. At first, the MCU 28 locates the servo head 11-2 and the data head 11-1 in the servo cylinder. Therefore, the MCU 28 outputs the command value for the servo cylinder to the D/A converter 20. The VCM 12 is thereby driven through the VCM drive circuit 21. Consequently, the servo head 11-2 and the data head 11-1 are seek-moved to the servo cylinder.

Next, the MCU 28 makes the data head 11-1 write the respective elements A–E of the servo pattern to the servo cylinder.

(S11) the MCU 28 offset-moves the data head 11-1 and servo head 11-2 from the seek position to a −6 μm position. Therefore, MCU 28 sets the −6 μm off-track correction value as a command value and output it to the D/A converter 20. Hence, the data head 11-1 is shifted from the seek position to the −6 μm inner position.

(S12) The MCU 28, as in the above-mentioned case, examines whether or not the seek error occurs. That is, the MCU 28 reads the servo signal of the servo head 11-2 at the interval of the predetermined period through the A/D converter 17, and checks whether or not the servo signals converge. If the servo signals do not converge within the predetermined time, it is judged that the servo head is located in the boundary position of the servo track. The occurrence of the seek error is thereby detected.

When the seek error occurs, the MCU 28 executes the error process. For instance, the MCU 28 inhibits the data head from reading and writing the data.

(S13) On the other hand, the MCU 28, when determining that no seek error occurs, makes the data head 11-1 read the servo data on the servo cylinder in this head position through the A/D converter 25. Then, as described above, the MCU 28 calculates the off-track correction value from the detection output levels a, b, c, d, e of the respective elements A, B, C, D, E of the read servo data.

(S14) The MCU 28 calculates a difference between the off-track correction value measured last time in the offset position (the off-track position) and the off-track correction value measured this time in the offset position (the off-track position). The MCU 28 determines whether or not this difference is under a fixed value. If the difference is under the fixed value, it can be considered that the off-track correction value measured last time in the offset position (the off-track position) and the off-track correction value measured this time in the offset position (the off-track position), are continuous and kept in the linear relationship. Accordingly, this offset position is undefined as the sensitivity abnormal position, and the operation proceeds to step S16.

(S15) Whereas if the difference exceeds the fixed value, the off-track correction value measured last time in the offset position (the off-track position) and the off-track correction value measured this time in the offset position (the off-track position), are in a discontinuous relationship. Therefore, this offset position is judged as the sensitivity abnormal position, and the memory stores that off-track correction value.

(S16) Next, the MCU 28 updates the offset quantity up to an offset quantity on the order of +0.125 $\mu$m. This value 0.125 $\mu$m is a unit quantity of the measuring step.

(S17) The MCU 28 determines whether or not the offset quantity exceeds +6 $\mu$m delimiting the measurement maximum range. If the offset quantity exceeds +6 $\mu$m, there is finished the detection of the sensitivity abnormal portion from −6 $\mu$m to +6 $\mu$m on the "+0.125 $\mu$m" basis, resulting in the normal end.

Whereas if the offset quantity does not exceed +6 $\mu$m, the MCU 28 offset-moves the head with the offset quantity. Then, the operation returns to step S12.

Thus, the sensitivity abnormal position is searched within the predicted offset quantity range (from −6 $\mu$m to +6 $\mu$m) when in the servo writing process, and the memory is stored with that off-track correction value (the off-track quantity).

Next, a correction value measuring process performed at the interval of the fixed time will be explained with reference to FIG. 9.

(S20) First of all, the MCU 28 locates the servo head 11-2 and the data head 11-1 in the servo cylinder recorded with the off-track correction servo pattern. Therefore, the MCU 28 outputs, to the D/A converter 20, a command value obtained by adding the off-track correction value to the command value for the servo cylinder. The VCM 12 is thereby driven through the VCM drive circuit 21. Consequently, the servo head 11-2 and the data head 11-1 are seek-moved to the servo cylinder.

(S21) The MCU 28 determines whether or not this offset position is the sensitivity abnormal position. Then, the MCU 28 determines whether or not the off-track correction value used this time is identical with the off-track correction value stored as the sensitivity abnormal position in the memory. If the off-track correction value used this time is not identical with the off-track correction value stored in the memory, it follows that the head is not located in the sensitivity abnormal position. Therefore the operation proceeds to step S25.

(S22) Whereas if the off-track correction value used this time is identical with the off-track correction value stored in the memory, it is judged that the head is located in the sensitivity abnormal position. Then, as shown in FIG. 5 before, the data head 11-1 and the servo head 11-2 are, as illustrated in FIG. 5, offset-moved from the center position to a "+0.5 $\mu$m" position (referred to as the outer position).

Therefore, the MCU 28 sets the +0.5 $\mu$m off-track correction value as a command value and output it to the D/A converter 20. Hence, the data head 11-1 is shifted from the center position to a +0.5 $\mu$m outer position as shown in FIG. 5.

The MCU 28, as in the above-mentioned case, examines whether or not the seek error occurs. The MCU 28 checks whether or not the servo signals from the A/D converter 17 converge. If the servo signals do not converge within the predetermined time, it is determined that the servo head is located in the boundary position of the servo track. The occurrence of the seek error is thereby detected. When the seek error occurs, the MCU 28 proceeds to step S24.

On the other hand, the MCU 28, when finding that no seek error occurs, makes the data head 11-1 read the servo data on the servo cylinder in this outer position through the A/D converter 25. Then, the MCU 28 holds the detection output levels a, b, c, d, e of the respective elements A, B, C, D, E of the read servo data.

(S23) The MCU 28 offset-moves the data head 11-1 and the servo head 11-2 from the center position to a −0.5 $\mu$m position (called an inner position) as shown in FIG. 5. Therefore, the MCU 28 sets a −1.0 $\mu$m off-track correction value as a command value, and outputs it to the D/A converter 20. Hence, the data head 11-1 is, as illustrated in FIG. 5, located in the −0.5 $\mu$m inner position.

The MCU 28, as in the above-mentioned case, examines whether or not the seek error occurs. The MCU 28 checks whether or not the servo signals from the A/D converter 17 converge. If the servo signals do not converge within the predetermined time, it is determined judged that the servo head is located in the boundary position of the servo track. The occurrence of the seek error is thereby detected. When the seek error occurs, the MCU 28 proceeds to step S24.

On the other hand, the MCU 28, when finding that no seek error occurs, makes the data head 11-1 read the servo data on the servo cylinder in this inner position through the A/D converter 25. Then, the MCU 28 holds the detection output levels a, b, c, d, e of the respective elements A, B, C, D, E of the read servo data.

(S24) The MCU 28 offset-moves (which is called a 0 $\mu$m offset) the data head 11-1 and the servo head 11-2 to the center position as shown in FIG. 5. Therefore, the MCU 28 sets a +0.5 or −0.5 $\mu$m off-track correction value as a command value, and outputs it to the D/A converter 20. Hence, the data head 11-1 is, as illustrated in FIG. 5, located in the center position.

The MCU 28, as in the above-mentioned case, examines whether or not the seek error occurs. The MCU 28 checks whether or not the servo signals from the A/D converter 17 converge. If the servo signals do not converge within the predetermined time, it is determined that the servo head is located in the boundary position of the servo track. The occurrence of the seek error is thereby detected. When the seek error occurs, the MCU 28 executes the error process. For instance, the MCU 28 inhibits the data head from reading and writing the data.

(S25) On the other hand, the MCU 28, when judging that no seek error occurs, makes the data head 11-1 read the servo data on the servo cylinder in this center position through the A/D converter 25. Then, the MCU 28 holds the detection output levels a, b, c, d, e of the respective elements A, B, C, D, E of the read servo data. This reading process is executed three times.

(S26) In step S23 or S24, the MCU 28, when finishing the reading process of the servo data, calculates the off-track correction value. That is, as described above, the MCU 28 calculates the off-track correction value from the detection output levels a, b, c, d, e of the respective elements A, B, C, D, E of the read servo data.

In step S23, when reading the servo data, as explained above, the reading process is executed twice in the outer and inner positions, and hence the off-track correction value is calculated each time the reading process is done. Then, an average value of these off-track correction values is calculated. The off-track correction value to be stored is updated based on the thus measured off-track correction value.

In step S24, when reading the servo data, as explained above, the reading process is executed three times the center position, and hence the off-track correction value is calculated each time the reading process is done. Then, an average value of these off-track correction values is calculated. The off-track correction value to be stored is updated based on the thus measured off-track correction value.

Thus, the data head is offset on the inner and outer sides by detecting that the data head is located in the sensitivity abnormal position. Subsequently, the servo data is read in that offset position, thereby calculating the off-track correction value. Further, the off-track correction value in the center position is supplemented from those off-track correction values measured by offsetting. Hence, even when the head is located in the sensitivity abnormal portion, the accurate off-track correction value is obtained. Even if the track pitch is narrowed, the precise off-track correction is thereby attainable.

As described above, the data in the center position may be supplemented by the data in the inner and outer positions without using the measurement data in the center position.

Further, the fact that the data head is located in the sensitivity abnormal position is detected by the comparison with the previously measured off-track position, and the detection thereof can be thus easily made. Moreover, when there is an extra time for the servo writing process, the off-track position relative to the sensitivity abnormal position is measured. The measurement can be therefore performed more minutely.

Further, if the seek error occurs in the inner or outer offset position, it is impossible to measure the off-track quantity in the inner or outer position. Therefore, although there might be a possibility in which the center position is the sensitivity abnormal position, the off-track correction value measured in the center position is to be used. With this arrangement, there can be obtained a more precise off-track correction value than by using the off-track correction value measured last time without any measurement.

Figure 10:
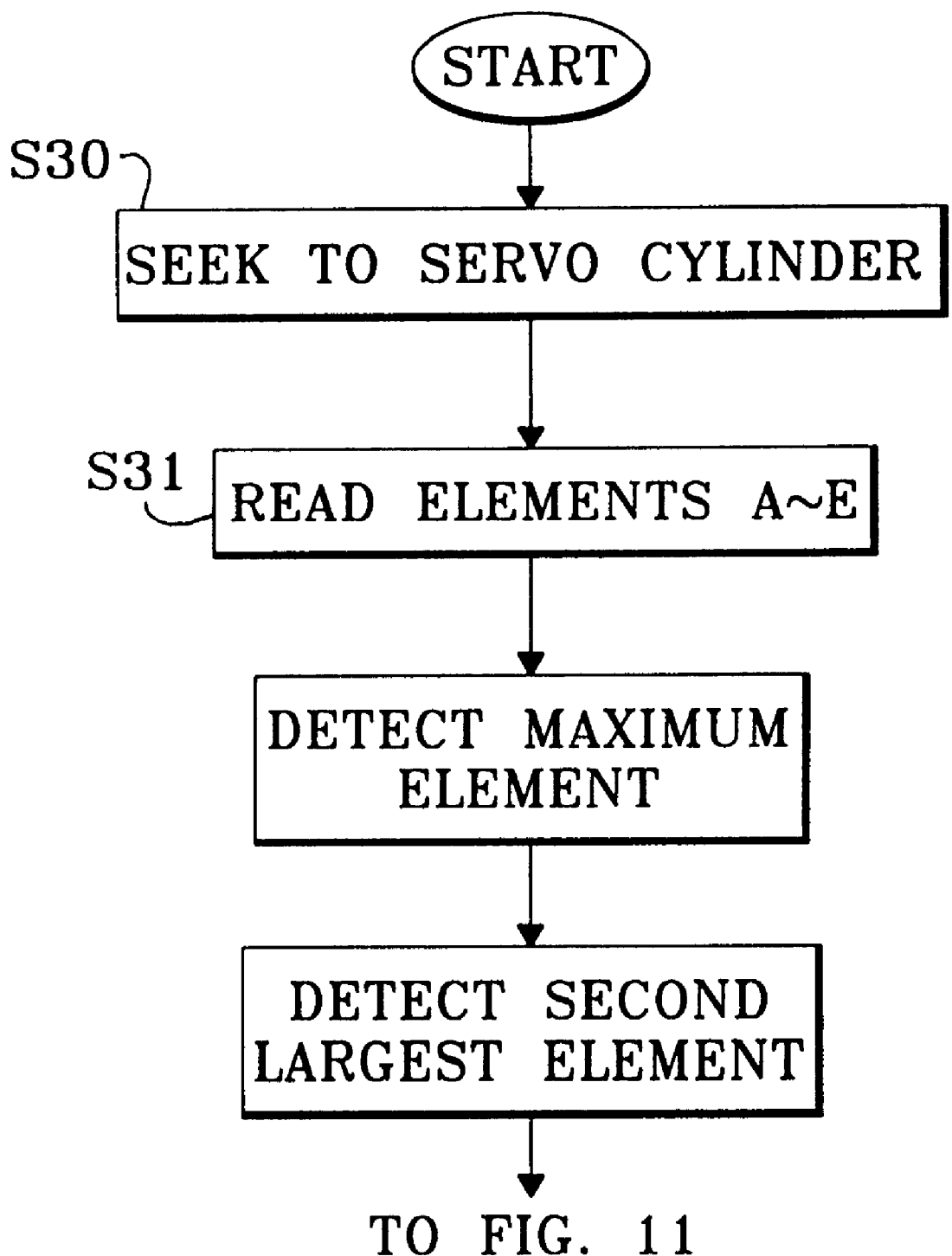
FIG. 10 is a flowchart (part 1) showing a measuring process in a fourth embodiment of the present invention.
Figure 11:
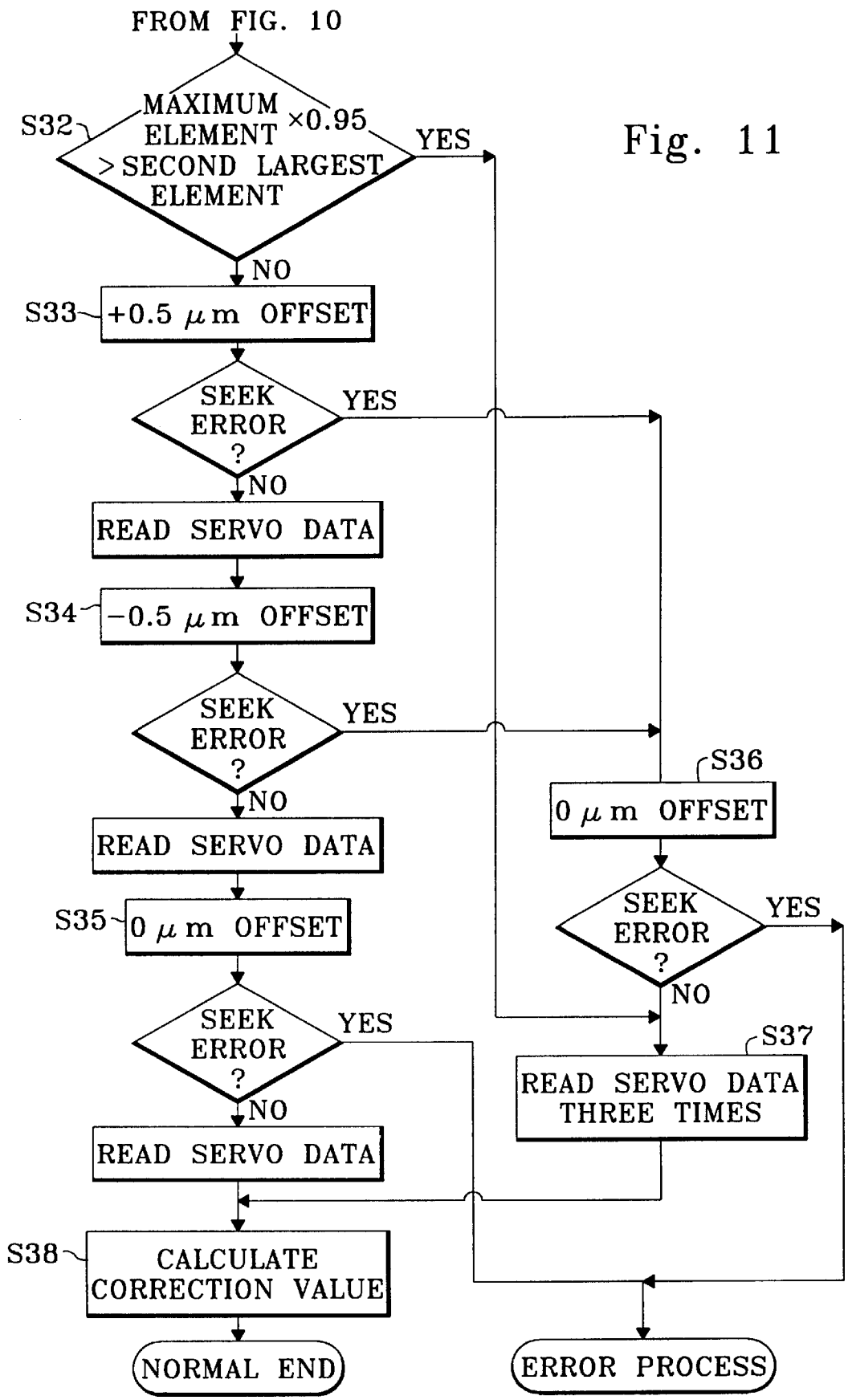
FIG. 11 is a flowchart (part 2) showing the measuring process in the fourth embodiment of the present invention.
Figure 12:
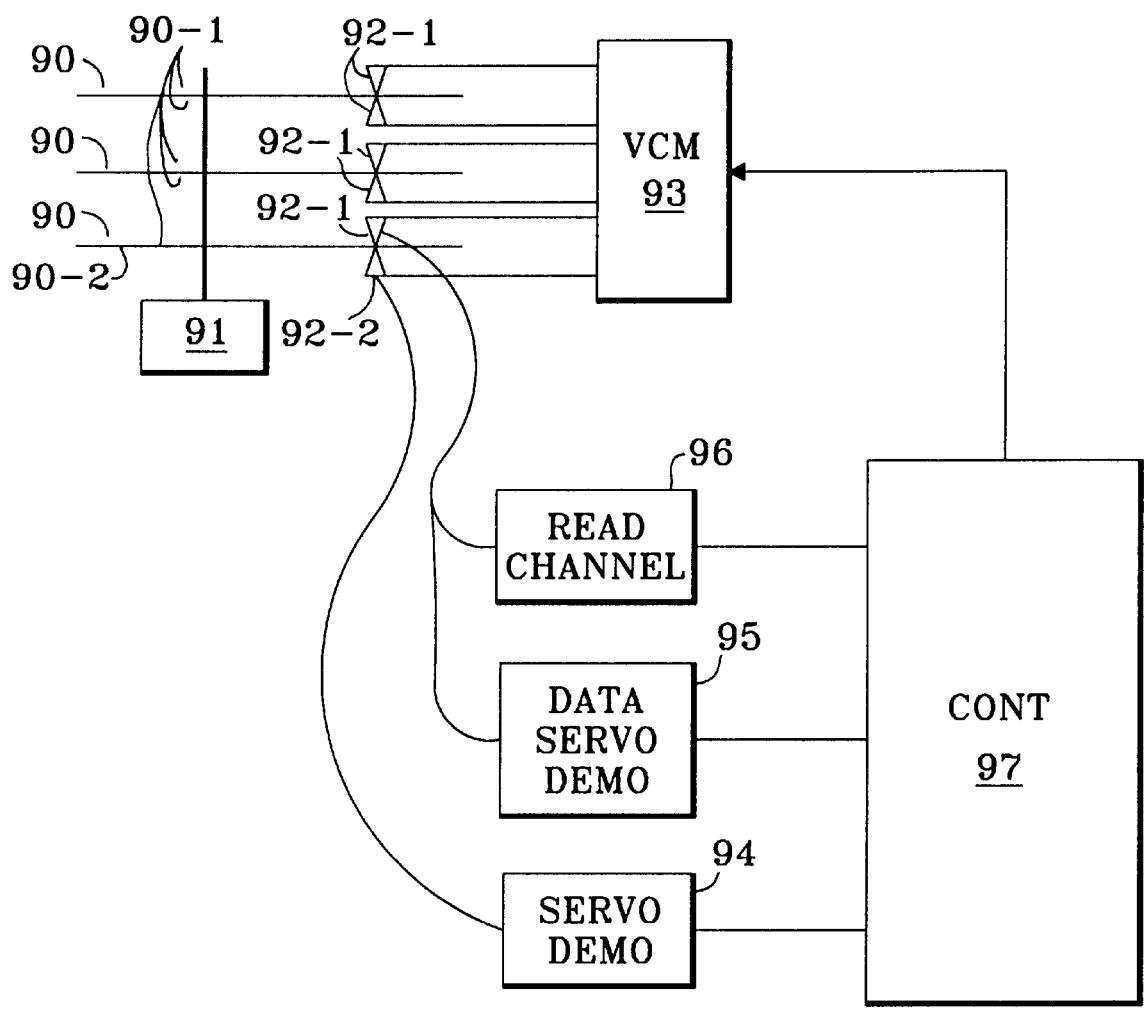
FIG. 12 is a diagram illustrating a construction in the prior art.
Figure 13:
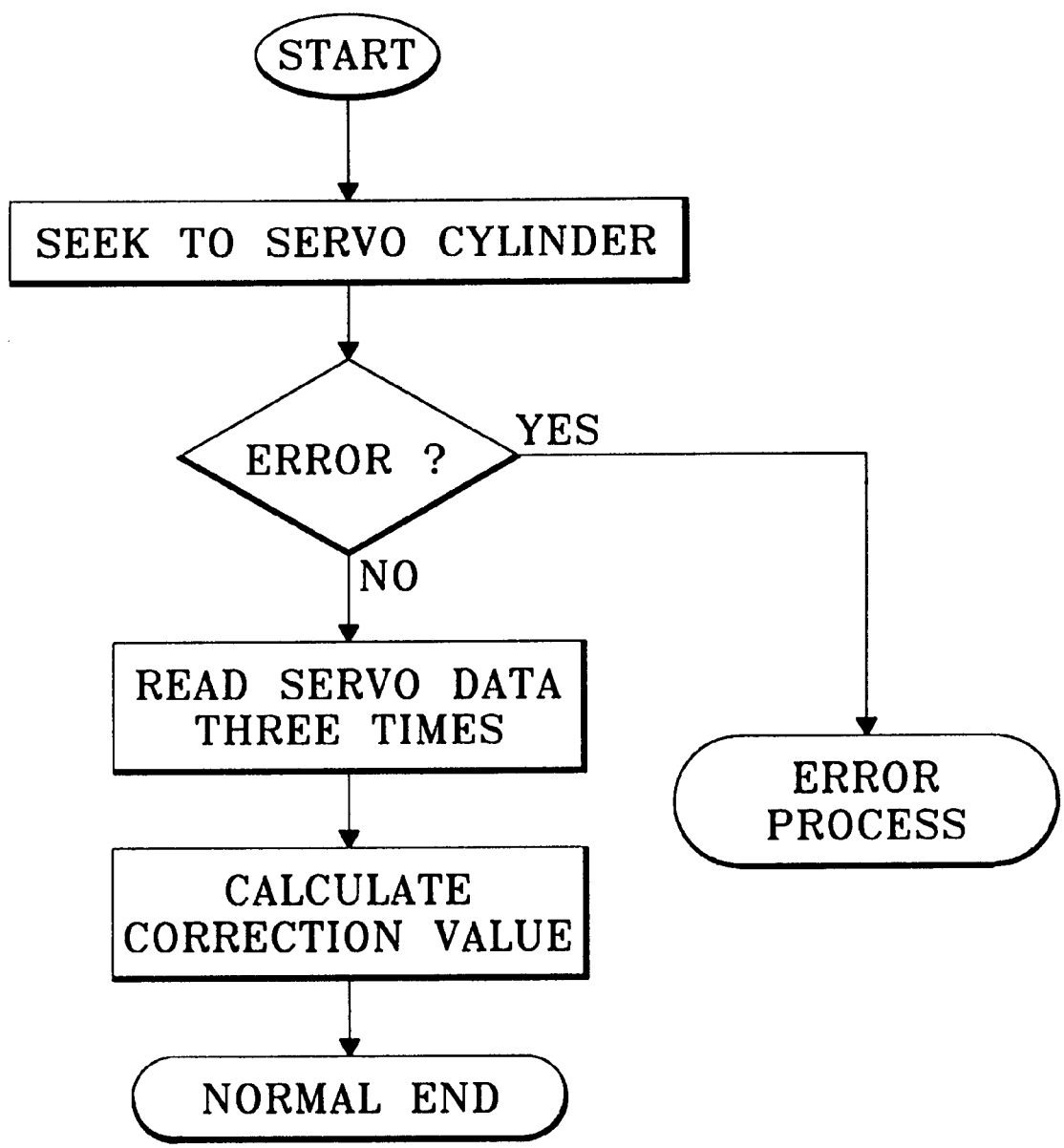
FIG. 13 is a flowchart showing an off-track correction value measuring process in the prior art.

FIGS. 10 and 11 flowcharts each showing a measuring process in a fourth embodiment of the present invention.

(S30) The measuring process is effected at the interval of the fixed time. After the fixed time has elapsed, upon an interrupt, the MCU 28 starts the measuring process of the off-track correction value.

To start with, the MCU 28 locates the servo head 11-2 and the data head 11-1 in the servo cylinder recorded with the off-track correction servo pattern. Therefore, the MCU 28 outputs, to the D/A converter 20, a command value obtained by adding the off-track correction value to the command value for the servo cylinder. The VCM 12 is thereby driven through the VCM drive circuit 21. Consequently, the servo head 11-2 and the data head 11-1 are seek-moved to the servo cylinder.

(S31) The MCU 28 makes the data head 11-1 read the servo data on the servo cylinder in this head position (termed the center position) through the A/D converter 25. Then, the MCU 28 detects the element exhibiting the maximum output level among the respective elements A, B, C, D, E of the read servo data, and detects a level thereof. Next, the MCU 28 detects the element having the second largest output level among the respective elements, and detects an output level thereof.

(S32) The MCU 28 multiplies the level of the element having the maximum output by 0.95. Subsequently, the MCU 28 compares a multiplied-by-0.95 maximum element value with a value of the element exhibiting the second largest level.

If the multiplied-by-0.95 maximum element value is not larger than the value of the element exhibiting the second largest level, the maximum element value is substantially equal to the second largest level element value. Hence, it is determined that the data head is located in the sensitivity abnormal position.

As discussed with reference to FIGS. 14 and 15, the sensitivity abnormal position appears in a switchover position of each element of the servo data. Accordingly, the fact that the maximum element value is substantially equal to the second largest level element value, is an implication of being located in the above-described switchover position. When determined to be located in the sensitivity abnormal position, the operation proceeds to step S33.

Whereas if the multiplied-by-0.95 maximum element value is larger than the second largest level element value, this leads to a judgement of being not located in the sensitivity abnormal position. Then, the operation proceeds to step S37.

(S33) The MCU 28, when found to be located in the sensitivity abnormal position, offset-moves the data head 11-1 and the servo head 11-2 from the center position to a +0.5 μm position (called the outer position) as shown in FIG. 5. Therefore, the MCU 28 sets a +0.5 μm off-track correction value as a command value, and outputs it to the D/A converter 20. Hence, the data head 11-1 is, as illustrated in FIG. 5, shifted from the center position to the +0.5 μm outer position.

The MCU 28, as in the above-mentioned case, examines whether or not the seek error occurs. The MCU 28 checks whether or not the servo signals from the A/D converter 17 converge. If the servo signals do not converge within the predetermined time, it is found that the servo head is located in the boundary position of the servo track. The occurrence of the seek error is thereby detected. When the seek error occurs, the MCU 28 proceeds to step S36.

On the other hand, the MCU 28, when judging that no seek error occurs, the data head 11-1 reads the servo data on the servo cylinder in this outer position through the A/D converter 25. Then, the MCU 28 holds the detection output levels a, b, c, d, e of the respective elements A, B, C, D, E of the read servo data.

(S34) The MCU 28 offset-moves the data head 11-1 and the servo head 11-2 from the center position to a −0.5 μm position (called the inner position) as shown in FIG. 5. Therefore, the MCU 28 sets a −1.0 μm off-track correction value as a command value,.and outputs it to the D/A converter 20. Hence, the data head 11-1 is, as illustrated in FIG. 5, located in the −0.5 μm inner position.

The MCU 28, as in the above-mentioned case, examines whether or not the seek error occurs. The MCU 28 checks whether or not the servo signals from the A/D converter 17 converge. If the servo signals do not converge within the predetermined time, it is determined that the servo head is located in the boundary position of the servo track. The occurrence of the seek error is thereby detected. Upon detecting the occurrence of the error, the MCU 28 proceeds to step S36.

On the other hand, the MCU 28, when finding that the seek error does not occur, makes the data head 11-1 read the servo data on the servo cylinder through the A/D converter 25 in this inner position. Then, the MCU 28 holds the detection output levels a, b, c, d, e of the respective elements A, B, C, D, E of the read servo data.

(S35) The MCU 28 offset-moves the data head 11-1 and the servo head 11-2 to the center position as shown in FIG. 5. Therefore, the MCU 28 sets a +0.5 μm off-track correction value as a command value, and outputs it to the D/A converter 20. Hence, the data head 11-1 is, as illustrated in FIG. 5, located in the center position.

The MCU 28, as in the above-mentioned case, examines whether or not the seek error occurs. The MCU 28 checks whether or not the servo signals from the A/D converter 17 converge. If the servo signals do not converge within the predetermined time, it is found that the servo head is located in the boundary position of the servo track. The occurrence of the seek error is thereby detected. When the seek error occurs, the MCU 28 executes the error process. For instance, the MCU 28 inhibits the data head from reading and writing the data.

On the other hand, the MCU 28, when judging that no seek error occurs, makes the data head 11-1 read the servo data on the servo cylinder in this center position through the A/D converter 25. Then, the MCU 28 holds the detection output levels a, b, c, d, e of the respective elements A, B, C, D, E of the read servo data.

(S36) In step S33 or S34, the MCU 28, when judging that the seek error occurs, offset-moves (called a 0 μm offset) the data head 11-1 and the servo head 11-2 to the center position. Therefore, the MCU 28 sets a −0.5 or +0.5 μm off-track correction value as a command value, and outputs it to the D/A converter 20. Hence, the data head 11-1 is, as illustrated in FIG. 5, located in the center position.

The MCU 28, as in the above-mentioned case, examines whether or not the seek error occurs. The MCU 28 checks whether or not the servo signals from the A/D converter 17 converge. If the servo signals do not converge within the predetermined time, it is found that the servo head is located in the boundary position of the servo track. The occurrence of the seek error is thereby detected. When the seek error occurs, the MCU 28 executes the error process. For example, the MCU 28 inhibits the data head from reading and writing the data.

(S37) On the other hand, the MCU 28, when judging that no seek error occurs, makes the data head 11-1 read the servo data on the servo cylinder in this center position through the A/D converter 25. Then, the MCU 28 holds the detection output levels a, b, c, d, e of the respective elements A, B, C, D, E of the read servo data. The MCU 28 performs this reading operation three times and holds the output levels of the servo data each time.

(S38) In step S35 or S37, the MCU 28, when finishing the reading process of the servo data, calculates the off-track correction value. That is, as described above, the MCU 28 calculates the off-track correction value from the detection output levels a, b, c, d, e of the respective elements A, B, C, D, E of the read servo data.

In step S35, when reading the servo data, as explained above, the reading process is executed three times in the outer, inner an center positions, and hence the off-track correction value is calculated each time the reading process is done. Then, an average value of these off-track correction values is calculated. The off-track correction value to be stored is updated based on the thus measured off-track correction value.

As shown in FIG. 6, the correction value in the center position with a possibility of being the sensitive abnormal position is to be corrected by the correction value in the inner and outer positions undefined as the sensitivity abnormal positions. Therefore, the off-track correction value in the center position becomes a more precise value.

On the other hand, in step S37, when reading the servo data, as stated above, the reading process is executed three times in the center position. Then, the off-track correction value is calculated each time the reading process is done, and the average value of theses off-track correction values is calculated. The off-track correction value is updated based on the thus measured off-track correction value. Then, the operation comes to an end.

Thus, the data head is offset on the inner and outer sides by detecting that the data head is located in the sensitivity abnormal position. Subsequently, the servo data is read in that offset position, thereby calculating the off-track correction value. Further, the off-track correction value in the center position is corrected based on those off-track correction values measured by offsetting. Hence, even when the head is located in the sensitivity abnormal position, the accurate off-track correction value is obtained. Even if the track pitch is narrowed, the precise off-track correction is thereby attainable.

Further, the fact that the data head is located in the sensitivity abnormal position is detected by comparing sizes of respective elements with each other, and it is therefore feasible to easily detect that the head is located in the sensitivity abnormal position.

Moreover, when the seek error happens in the inner or outer offset position, it is impossible to measure the off-track quantity in the inner or outer position. For this reason, although the center position has a possibility of being the sensitivity abnormal position, the off-track correction value measured in the center position is to be used. With this arrangement, a more accurate off-track correction value than by using the off-track correction value of the last time without any measurement, is obtained.

In addition to the embodiments discussed above, the present invention can be modified as follows. First, the servo cylinder is provided in the outermost position but may also be provided in a proper outer position. Second, the offset quantities on the inner and outer side are set equal but may be made different. Third, the present invention has been discussed by exemplifying the magnetic disk apparatus, but may be applicable to other disk apparatuses.

The present invention has been discussed so far by way of the embodiments but may be modified within the scope of the present invention. These modifications are not excluded from the range of the present invention.

As discussed above, the present invention exhibits the following effects. First, when head is located in the servo cylinder for measuring the off-track quantity, whether or not the head located position is defined as the cylinder sensitivity abnormal position, is detected. Then, the head is offset-moved on the inner and outer sides, and the first servo data are read, thereby calculating the precise off-track correction value. Therefore, the precise off-track correction value can be measured. The off-track correction can be thereby executed more accurately. Second, even when the track pitch is narrowed, it is therefore possible to effect the track correction without being influenced by the characteristics of the head.

What is claimed is:

1. An off-track correcting method, of measuring an off-track correction value, used for a disk apparatus including a disk medium having a data surface having a cylinder recorded with a first servo data for an off-track measurement and a servo surface containing a second servo data for locating in each cylinder, a data head for reading a signal on the data surface on said disk medium, a servo head for reading a signal on the servo surface on said disk medium, locating means for locating said data head and said servo head, and control means for controlling said locating means on the basis of a second servo signal read by said servo head and an off-track correction value, said off-track correcting method comprising:
   a seek step of seeking said servo head to a cylinder position recorded with the first servo data;
   a detecting step of detecting whether or not said data head is located in a sensitivity abnormal position of the cylinder with the off-track correction value being discontinuous;
   a first reading step of reading the first servo data with said data head after offset-moving said servo head and said data head by a predetermined quantity on an inner or outer side on said disk medium in accordance with detecting that said data head is located in the sensitivity abnormal position;
   a second reading step of reading the first servo data with said data head after offset-moving said servo head and said data head by the predetermined quantity on the outer or inner side on said disk medium; and
   a step of calculating an off-track correction value in the cylinder position from the plural pieces of first servo data read in at least said first and second reading steps.

2. The off-track correcting method of the disk apparatus according to claim 1, wherein said step of calculating the off-track correction value includes:
   a step of calculating an off-track correction value in each reading position from each of the plural pieces of first servo data read; and
   a step of obtaining the off-track correction value by calculating an average value of the thus calculated off-track correction values.

3. The off-track correcting method of the disk apparatus according to claim 1, further comprising:
   a step of reading the first servo data with said data head in a sought position by detecting that said data head is not located in the sensitivity abnormal position of the cylinder by seeking; and
   a step of calculating the off-track correction value in the cylinder position from the first servo data read.

4. The off-track correcting method of the disk apparatus according to claim 1, wherein said detecting step includes:
   a step of reading the first servo data with said data head after seeking said head to the cylinder position; and
   a step of detecting that said head is located in the sensitivity abnormal position from the first servo data read.

5. The off-track correcting method of the disk apparatus according to claim 4, wherein said detecting step includes:
   a step of measuring the off-track correction value from the first servo data read; and
   a step of detecting whether or not said data head is located in the sensitivity abnormal position by detecting whether or not a difference between the off-track correction value measured and off-track correction value measured last time, is above a predetermined value.

6. The off-track correcting method of the disk apparatus according to claim 4, wherein said detecting step includes:
   a step of detecting a reading level of each element of the first servo data consisting of a plurality of elements; and
   a step of detecting whether or not said data head is located in the sensitivity abnormal position by examining whether or not a ratio between a level of the element having a maximum reading level, of the first servo data and a level of the element having the second largest reading level, of the first servo data, is above a predetermined value.

7. The off-track correcting method of the disk apparatus according to claim 1, further comprising:
   a step of measuring the sensitivity abnormal position in advance from the off-track correction value,
   said detecting step including:
      a step of detecting whether or not said data head is located in the sensitivity abnormal position by comparing the off-track correction value when sought to the cylinder position and the off-track correction value measured.

8. The off-track correcting method of the disk apparatus according to claim 7, wherein said measuring step includes:
   a step of measuring the off-track correction value by reading the first servo data after offset-moving said servo head and said data head by a predetermined quantity;
   a step of detecting whether or not said data head is located in the sensitivity abnormal position from a difference between the respective off-track correction values in adjacent measurement positions; and
   a step of storing the off-track correction value in the sensitivity abnormal position.

9. The off-track correcting method of the disk apparatus according to claim 1, further comprising:
   a step of reading the first servo data with said data head after being moved to the cylinder position in said seek step corresponding to an occurrence of a seek error in said first reading step, and calculating the off-track correction value.

10. The off-track correcting method of the disk apparatus according to claim 1, further comprising:

a step of reading the first servo data with said data head after being moved to the cylinder position in said seek step corresponding to the occurrence of the seek error in said second reading step, and calculating the off-track correction value.

11. A disk apparatus including:

a disk medium having a data surface having a cylinder recorded with a first servo data for an off-track measurement and a servo surface containing a second servo servo data for locating in each cylinder;

a data head for reading a signal on the data surface on said disk medium;

a servo head for reading a signal on the servo surface on said disk medium;

locating means for locating said data head and said servo head; and control means for controlling said locating means on the basis of a second servo signal read by said servo head and an off-track correction value, wherein said control means seek said servo head to a cylinder position recorded with the first servo data, detect whether or not said data head is located in a sensitivity abnormal position of the cylinder with the off-track correction value being discontinuous, read the first servo data with said data head after offset-moving said servo head and said data head by a predetermined quantity on an inner or outer side on said disk medium in accordance with detecting that said data head is located in the sensitivity abnormal position, read the first servo data with said data head after offset-moving said servo head and said data head by the predetermined quantity on the outer or inner side on said disk medium and calculate the off-track correction value in the cylinder position from the plural pieces of first servo data read in both reading operations.

12. The disk apparatus according claim 11, wherein said control means calculate an off-track correction value in each reading position from each of the plural pieces of first servo data read, and obtain the off-track correction value by calculating an average value of the thus calculated off-track correction values.

13. The disk apparatus according to claim 11, wherein said control means read the first servo data with said data head in a sought position by detecting that said data head is not located in the sensitivity abnormal position of the cylinder by seeking, and calculate the off-track correction value in the cylinder position from the first servo data read.

14. The disk apparatus according to claim 11, wherein said control means detect that said head is located in the sensitivity abnormal position from the first servo data read in a sought cylinder position.

15. The disk apparatus according to claim 14, wherein said control means measure the off-track correction value from the first servo data read and detect whether or not said data head is located in the sensitivity abnormal position by detecting whether or not a difference between the off-track correction value measured and off-track correction value measured last time, is above a predetermined value.

16. The disk apparatus according to claim 14, wherein said control means detect whether or not said data head is located in the sensitivity abnormal position by examining whether or not a ratio between a level of a element having a maximum reading level, of the first servo data and a level of the element having the second largest reading level, of the first servo data, is above a predetermined value.

17. The disk apparatus according to claim 11, wherein said control means detect whether or not said data head is located in the sensitivity abnormal position by comparing the off-track correction value when sought to the cylinder position and a predetermined off-track correction value measured.

* * * * *

UNITED STATES PATENT AND TRADEMARK OFFICE
CERTIFICATE OF CORRECTION

PATENT NO. : 5,926,337
DATED : July 20, 1999
INVENTOR(S) : Itou et al.

It is certified that error appears in the above-identified patent and that said Letters Patent is hereby corrected as shown below:

On the title page,

Under "[57] Abstract" line 5, delete "seals"

and insert --seeks-- therefor.

Under "[57] Abstract" line 14, delete

"plural" and delete "finally".

Under "[57] Abstract" line 15, delete "This"

and insert --Thus-- therefor.

Signed and Sealed this

Twentieth Day of March, 2001

Attest:

NICHOLAS P. GODICI

*Attesting Officer*    *Acting Director of the United States Patent and Trademark Office*